(12) United States Patent
Clinton et al.

(10) Patent No.: US 11,694,566 B2
(45) Date of Patent: Jul. 4, 2023

(54) METHOD FOR ACTIVITY-BASED LEARNING WITH OPTIMIZED DELIVERY

(71) Applicant: Avail Support Ltd, Carrickmacross (IE)

(72) Inventors: Lisa Marie Clinton, Carrickmacross (IE); Mary Ann Cronin, Dalkey (IE)

(73) Assignee: Avail Support Ltd., Carrickmacross (IE)

( * ) Notice: Subject to any disclaimer, the term of this patent is extended or adjusted under 35 U.S.C. 154(b) by 33 days.

(21) Appl. No.: 16/755,279

(22) PCT Filed: Oct. 11, 2018

(86) PCT No.: PCT/IB2018/057903
§ 371 (c)(1),
(2) Date: Apr. 10, 2020

(87) PCT Pub. No.: WO2019/073441
PCT Pub. Date: Apr. 18, 2019

(65) Prior Publication Data
US 2020/0242952 A1      Jul. 30, 2020

Related U.S. Application Data

(60) Provisional application No. 62/571,068, filed on Oct. 11, 2017.

(51) Int. Cl.
*G09B 5/12* (2006.01)
*G09B 7/02* (2006.01)

(52) U.S. Cl.
CPC ............... *G09B 5/12* (2013.01); *G09B 7/02* (2013.01)

(58) Field of Classification Search
CPC ............. G09B 5/12; G09B 7/00; G09B 7/02
See application file for complete search history.

(56) References Cited

U.S. PATENT DOCUMENTS

| 8,182,267 B2 | 5/2012 | Katz et al. |
| 9,126,122 B2 | 9/2015 | Boeckle |

(Continued)

FOREIGN PATENT DOCUMENTS

| CN | 103748623 A | 4/2014 |
| CN | 103794110 A | 5/2014 |
| WO | 2014/009918 A1 | 1/2014 |

OTHER PUBLICATIONS

"Activity Trainer," by Accelerations Educational Software, https://www.dttrainer.com/, Available at: https://web.archive.org/web/20170920232603/http://www.dttrainer.com/ (Sep. 20, 2017).

(Continued)

*Primary Examiner* — Eddy Saint-Vil
(74) *Attorney, Agent, or Firm* — Volpe Koenig

(57) ABSTRACT

According to techniques and systems disclosed herein a pre-assessment profile may be generated for a learner based on a designated activity. The pre-assessment profile may be based on evaluating learner provided inputs or responses to one or more inquiries. A designated activity may be received and a plurality of activity steps to perform the designated activity may be generated and may be based on the pre-assessment profile. A media type may be identified for each activity step of the plurality of activity steps based on the pre-assessment profile for the learner, and may be provided to the learner. A learner's ability to perform the designated activity may be determined, based on applicable feedback information. According to techniques disclosed herein, a trigger event may be learned during learning mode and may include trigger event surrounding data for a behavioral attribute. A response may be generated based on detecting the trigger event.

18 Claims, 15 Drawing Sheets

(56) References Cited

U.S. PATENT DOCUMENTS

| | | | |
|---|---|---|---|
| 2002/0187463 A1 | 12/2002 | Aspe et al. | |
| 2004/0009462 A1* | 1/2004 | McElwrath | G09B 7/02 434/350 |
| 2008/0254432 A1 | 10/2008 | Woolf et al. | |
| 2008/0261191 A1 | 10/2008 | Woolf et al. | |
| 2008/0298549 A1 | 12/2008 | Quill et al. | |
| 2009/0097757 A1 | 4/2009 | Wimsatt | |
| 2010/0035225 A1* | 2/2010 | Kerfoot, III | G09B 7/00 434/335 |
| 2011/0130172 A1* | 6/2011 | Rao | G09B 7/02 434/322 |
| 2011/0229862 A1 | 9/2011 | Parikh | |
| 2012/0129141 A1 | 5/2012 | Granpeesheh | |
| 2012/0329013 A1* | 12/2012 | Chibos | G09B 7/02 434/157 |
| 2012/0330869 A1 | 12/2012 | Durham | |
| 2013/0224718 A1* | 8/2013 | Woodward | G09B 7/00 434/350 |
| 2013/0316324 A1 | 11/2013 | Hoffmann | |
| 2014/0024009 A1* | 1/2014 | Nealon | G09B 5/12 434/362 |
| 2014/0141400 A1* | 5/2014 | Ferreira | G09B 5/02 434/350 |
| 2014/0272847 A1 | 9/2014 | Grimes et al. | |
| 2014/0295389 A1 | 10/2014 | Izak et al. | |
| 2015/0099946 A1 | 4/2015 | Sahin | |
| 2015/0243180 A1* | 8/2015 | Kim | G09B 7/02 434/362 |
| 2015/0302763 A1* | 10/2015 | Gleim | G09B 7/04 434/237 |
| 2016/0035242 A1* | 2/2016 | Morrison | G09B 7/00 434/169 |
| 2016/0042661 A1* | 2/2016 | Minkoff | G09B 7/00 434/157 |
| 2017/0084189 A1 | 3/2017 | Rubalcaba | |
| 2017/0098385 A1 | 4/2017 | Martucci et al. | |
| 2017/0243501 A1* | 8/2017 | Cardonha | G09B 7/04 |
| 2018/0130375 A1* | 5/2018 | Booth | G09B 7/02 |

OTHER PUBLICATIONS

"Apex Spectrum Guide," by Apex eSystems, LLC (as described in BusinessWire, "Apex Spectrum Guide Released for April's Autism Awareness Month," Available at: https://www.businesswire.com/news/home/20130403005100/en/Apex-Spectrum-Guide-Released-for%C2%A0April%E2%80%99s-Autism-Awareness) (Apr. 3, 2013).

"BrainPro® Autism," by Scientific Learning Corp, (as described in BusinessWire, "Scientific Learning's New Software Improves Communication Skills in Kids With Autism," Available at: https://www.businesswire.com/news/home/20110721007077/en/Scientific-Learning%E2%80%99s-New-Software-Improves-Communication-Skills) (Jul. 22, 2011).

"Essential Skills Advantage," (as described in AutismInMyLife, "Online Learning Tools & Softwares," Available at: https://autisminmylife.com/online-learning-tools-softwares/) (Sep. 14, 2017).

"IMsocial," by Autism SA, https://www.autismsa.org.au/im-social, Available at: https://web.archive.org/web/20170217213720/https://www.autismsa.org.au/im-social (Feb. 17, 2017).

"Jacob's Lessons," www.jacobslessons.com (as described by https://www.exceptionallygoodfriends.com/helpful-websites.html), Available at: https://web.archive.org/web/20170228165146/https://www.exceptionallygoodfriends.com/helpful-websites.html (Feb. 28, 2017).

"Life Skills Winner," (as described by AbleData at https://abledata.acl.gov/product/life-skills-winner-app), (Aug. 30, 2016).

"Monarch Teaching Technologies, Inc.," Technology to Transform the Special Education Classroom: Available at: http://monarchteachtech.com/wp-content/uploads/2013/03/VizZle-Brochure.pdf (2013).

"Neuropath Learning," www.neuropathlearning.com, Available at: https://web.archive.org/web/20170920232649/http://www.neuropathlearning.com/ (Sep. 20, 2017).

"Skills: The Online Autism Solution," www.skillsforautism.com, Available at: https://web.archive.org/web/20160422175654/https://www.skillsforautism.com/Teachers (Apr. 22, 2016).

"Fast ForWord®" by Sound Learning and Wellness, LLC, Available at https://www.soundlearningandwellness.com/about-fast-forword, (2014).

"TeachTown Basics," by TeachTown, web.teachtown.com, Available at: https://web.archive.org/web/20171009111942/http://web.teachtown.com/products/teachtown-basics/.com/ (Oct. 9, 2017).

"Watch Me Learn," http://www.watchmelearn.com/, Available at: https://web.archive.org/web/20170920232646/http://www.watchmelearn.com/ (Sep. 20, 2017).

"Whoosh Learning," www.whooshlearning.com, Available at: https://web.archive.org/web/20170920232600/http://www1.whooshlearning.com/?kw= (Sep. 12, 2013).

* cited by examiner

| 610 | 620 | 621 | 630 | 640 | 650 | 660 | 670 | 680 | 690 |
|---|---|---|---|---|---|---|---|---|---|
| Designated Activity A | Pre Assessment | | V1 | Assessment 1 | V2 | Assessment 2 | V3 | Assessment 3 | V4 |
| Activity Steps | | | 26 | | 24 | | 17 | | 0 |
| Step 1 | 80 | Image | 1 | Y | 0 | Y | 0 | Y | 0 |
| Step 2 | 80 | Image | 1 | N | 1 | Y | 0 | Y | 0 |
| Step 3 | 80 | Image | 1 | N | 1 | Y | 0 | Y | 0 |
| Step 4 | 60 | Audio+Image | 2 | N | 2 | Y | 0 | Y | 0 |
| Step 5 | 60 | Audio+Image | 3 | N | 2 | N | 1 | Y | 0 |
| Step 6 | 60 | Audio+Image | 3 | N | 2 | N | 1 | Y | 0 |
| Step 7 | 60 | Audio+Image | 3 | N | 2 | N | 2 | Y | 0 |
| Step 8 | 30 | Video | 4 | N | 3 | N | 2 | Y | 0 |
| Step 9 | 30 | Video | 4 | N | 3 | N | 2 | Y | 0 |
| Step 10 | 30 | Video | 4 | N | 3 | N | 3 | Y | 0 |
| Step 11 | | | - | Step added | 3 | N | 3 | Y | 0 |
| Step 12 | | | - | Step added | 4 | N | 3 | Y | 0 |

| | |
|---|---|
| Natural cue | 0 |
| Image or text only | 1 |
| Audio only | 2 |
| Audio + Image | 3 |
| Video | 4 |

|   | Date of change | Task Grade | % change/EOL |
|---|---|---|---|
| Original |   | 26 | 0% |
| Assessment 1 | D1 | 26 | 0% |
| Assessment 2 | D2 | 24 | 8% |
| Assessment 3 | D3 | 17 | 29% |
| Assessment 4 | D4 | 0 | 100% |

FIG. 6B

METHOD FOR ACTIVITY-BASED LEARNING WITH OPTIMIZED DELIVERY

BACKGROUND

Individuals seeking to learn a new activity, including able bodied individuals, individuals in recovery, elderly individuals, and/or individuals with learning or other disabilities, may require assistance in completing daily tasks. Such individuals can benefit from the use of clear, individualized prompts to aid communication, and understanding, and enable them to be confident while completing activities in their daily lives.

Independent living can benefit individuals with disabilities and/or children by providing them the tools that they need to both complete and learn how to complete activities. Providing individual specific prompts can also enable automatic learning of an individual's preferred modes of absorbing instruction, over time, allowing faster learning for the individual.

SUMMARY

According to implementations disclosed herein, a pre-assessment profile may be generated for a learner based on a designated activity. The pre-assessment profile may be based on evaluating learner provided inputs or responses to one or more inquiries. A designated activity may be received and a plurality of activity steps to perform the designated activity may be generated and may be based on the pre-assessment profile. A media type may be identified for each activity step of the plurality of activity steps based on the pre-assessment profile for the learner. The selection of the media type may reduce the resource drain on a system by reducing the amount of data required to be pulled form the system. An output device may be selected based on the media type, based on resources available, and/or based on learner preference. The plurality of activity steps may be provided to a learner based on the identified media type for each activity step. Feedback information based on the learner's performance of the plurality of activity steps may be received and a learner's ability to perform the designated activity may be determined, based on the feedback information.

According to implementations disclosed herein, a learning mode may include receiving a first indication of a behavior attribute occurring at a first time, receiving a plurality of surrounding data at the first time based on receiving the indication of the behavior attribute, storing a trigger event for the behavior attribute, the trigger event comprising one or more of the plurality of surrounding data recorded at the first time, updating the trigger event for the behavior attribute based on receiving a second indication of the behavior attribute occurring at a second time after the first time and recording the plurality of surrounding data at the second time, and storing the updated trigger event for the behavior attribute. A monitoring mode may include detecting the plurality of surrounding data at a third time, determining the occurrence of the updated trigger event based on detecting the plurality of surrounding data at the third time, activating a response based on detecting the occurrence of the updated trigger event, and updating the trigger event for the behavior attribute based on detecting the plurality of surrounding data at the third time.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

FIG. 6A is a chart that shows prompt reduction and/or mastery;

FIG. 6B is chart that shows EOL based on FIG. 6A;

DETAILED DESCRIPTION

Figure 1:
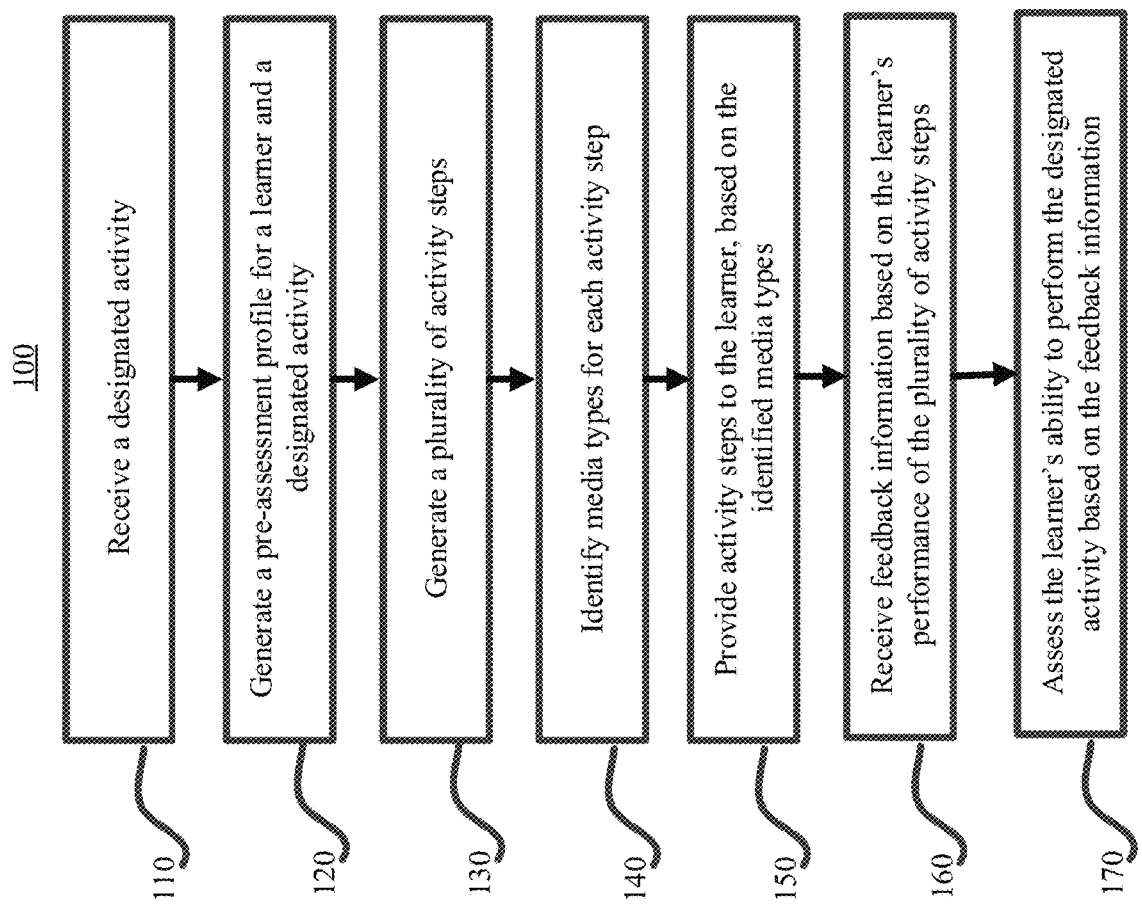
FIG. 1 is a flowchart for a activity based learning.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The system and techniques disclosed herein may provide an individualized learning support, designed to be used by both children and adults with Autism Spectrum Disorder, Down Syndrome, Learning Disabilities, Developmental Coordination Disorder, cognitive disabilities, or by anyone who requires assistance in completing self-management skills, or any individual, disabled or able bodied, who is seeking to learn an activity. It may utilize principles of any learning techniques including bespoke research, Applied Behavior Analysis (ABA) research, and/or best practice in the field, empowering a third part such as, but not limited to, a parent or caregiver in creating and implemented an effective program in their own work and/or living environment. The system and techniques may provide step-by-step prompts based on the task, based on an environment, based on a person's ability and/or enable third parties to do the same.

Further, in accordance with the disclosed subject matter, the provided system may gather and store information about a learner. The information may include the learner's triggers, which lead to potentially dangerous behavior such as, for example, aggression or self-aggression, physical imbalance, loss of control or understanding, etc. The system may provide content that either reduces the probability of the onset of such behavior and/or may provide a notification to a third party provider, which alerts the third party provider of such behavior.

The system and techniques disclosed herein may be implemented with the use of a local or remote server and/or storage system, or any other applicable system such as a distributed system. As an example, one or more blockchain based techniques may be used to store and/or communicate information related to the implementations disclosed herein. The server and/or storage system may store any applicable data such as designated activity, activity tasks including content (e.g., images, videos, audio, text, etc.) As specific examples, the server and/or storage system may include designated activities related to employment based skills, daily activity skills, hygiene skills, dressing skills, community skills, sexual activities, behaviors, or the like. The server and/or storage system may be accessed via wired and/or wireless communication such as via an Internet connection, a Bluetooth connection, a Wi-Fi connection, or the like.

The activity steps, responses to trigger events, and responses to inquiries, as provided herein may be provided via one or more output devices. These output devises may be selected based on the hardware performance of the output device, a connection with the output device (e.g., Bluetooth, Wi-Fi, infra red, etc.), and/or a current status of the output device. The selection of the output device may enable the system to optimize the delivery of an activity step, response to a trigger event, and/or response to an inquiry by allowing quick and seamless delivery.

Figure 11A:
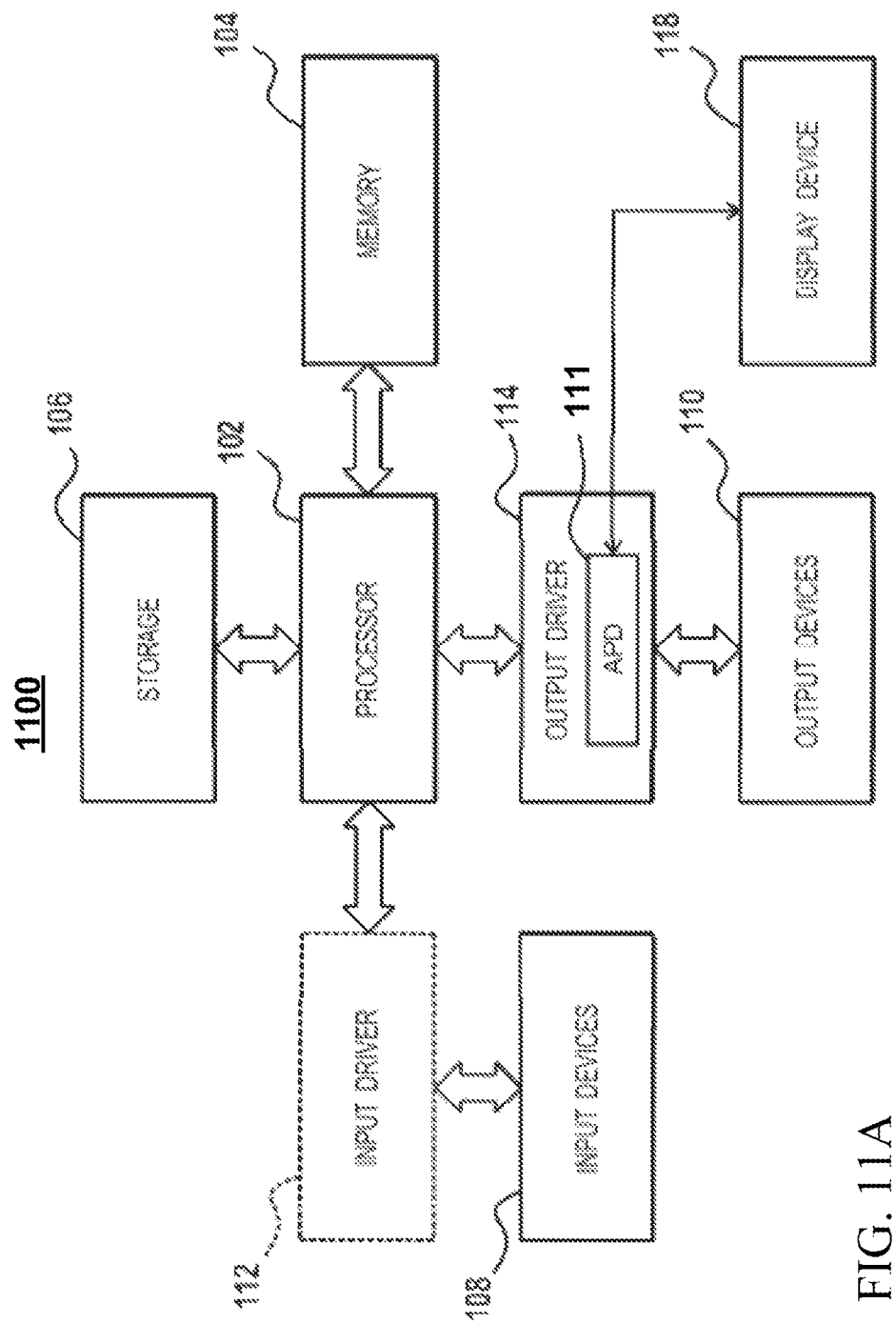
FIG. 11A is a block diagram of an example device.

FIG. 11A is a block diagram of an example device 1100 in which one or more features of the disclosure can be implemented. The device 1100 could be one of, but is not limited to, for example, a computer, a gaming device, a handheld device, a set-top box, a television, a mobile phone, a tablet computer, a wearable watch, a holographic device, a virtual reality device, an augmented reality device, or other computing device. The device 1100 may be used to provide activity steps, responses to trigger events, and/or responses to inquiries, as further disclosed here. Alternatively or addition, the device may be used to provide an input by a learner, a user, or a third party user, as further disclosed herein. The device 1100 includes a processor 102, a memory 104, a storage 106, one or more input devices 108, and one or more output devices 110. The device 1100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 1100 can include additional components not shown in FIG. 11A.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, an eye gaze sensor 530, or a network connection (e.g., a wireless local area network card for transmission and/or reception of wireless IEEE 802 signals). The output devices 111 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118. In some implementations, display device 118 includes a desktop monitor or television screen. In some implementations display device 118 includes a head-mounted display device ("HMD"), which includes screens for providing stereoscopic vision to a user. In some implementations the HMD also includes an eye gaze sensor for determining the direction in which the eye of a user is looking.

Figure 11B:
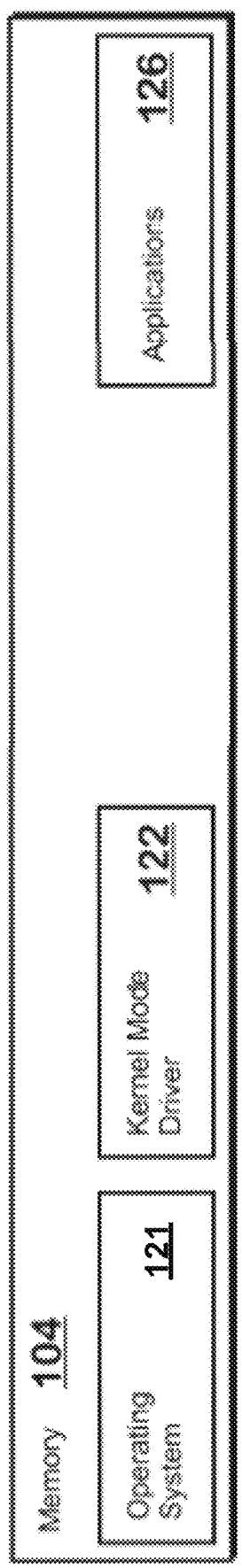
FIG. 11B is a block diagram of details of the example device of FIG. 11A.

FIG. 11B illustrates details of the device 1100, according to an example. The processor 102 (FIG. 11A) executes an operating system 121, a driver 122, and applications 126, and may also execute other software alternatively or additionally. The operating system 121 controls various aspects of the device 1100, such as managing hardware resources, processing service requests, scheduling and controlling process execution, and performing other operations.

Figure 11C:
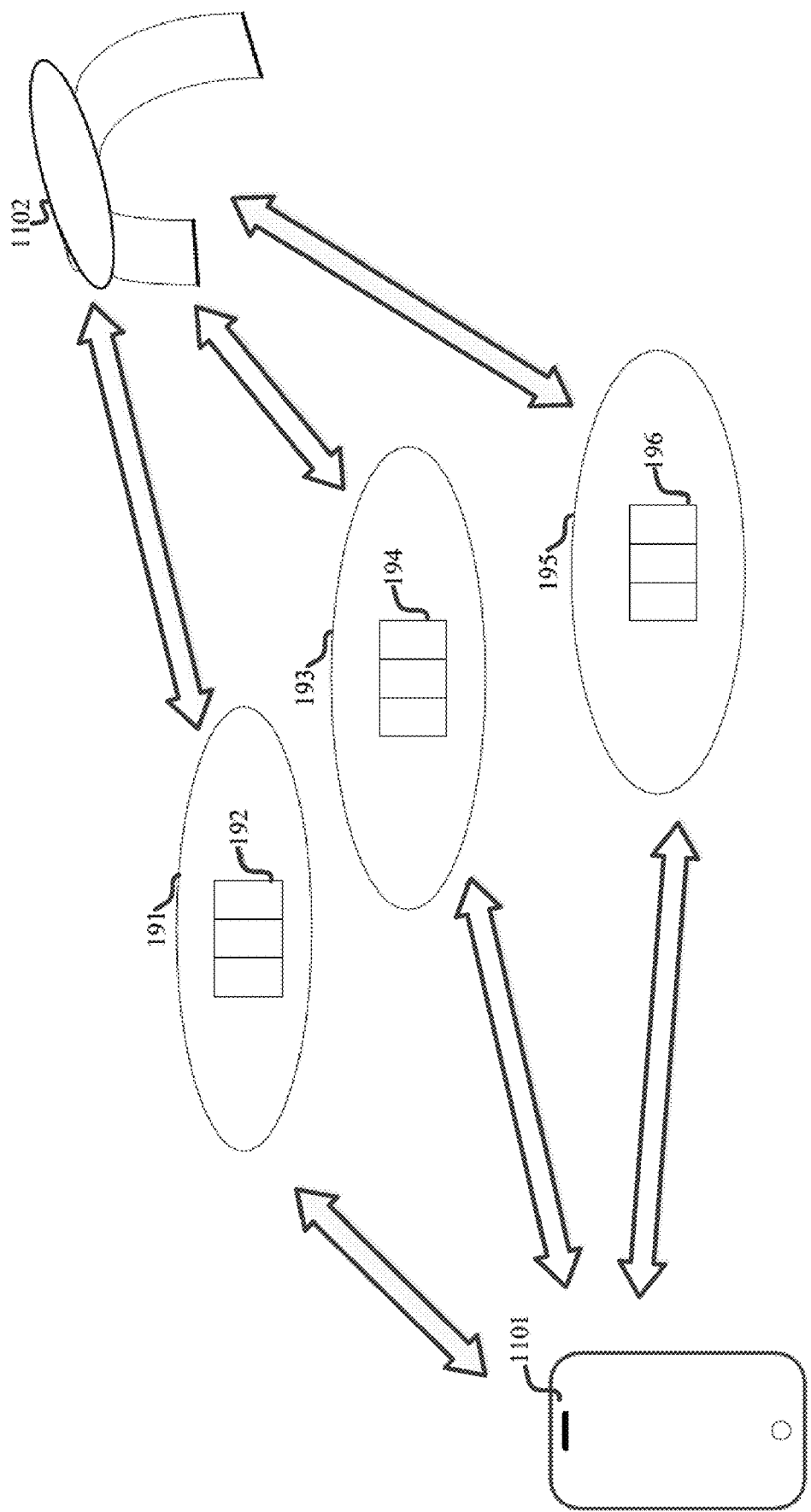
FIG. 11C is a diagram of a communication system.

FIG. 11C illustrates an example configuration communication system which includes a portable device 1101 and a wearable device 1102. It will be understood that portable device 1101 and/or wearable device 1102 include the same or similar details as device 1100 of FIG. 11A. As shown, the portable device 1101 and/or wearable device 1102 may communicate with one or more of a server 191, database 193, or remote storage 195. The server 191, database 193, and remote storage 195 may include respective libraries 192, 194, and 196 or other storage mechanism or mediums (not shown).

As shown at step 110 of the flowchart 100 in FIG. 1, a designated activity may be received. The designated activity may include, but is not limited to a daily activity, an employment based activity, an indoor activity, an outdoor activity, or the like. The designated activity may be the activity which the user intends to learn or which a third party requires or suggests the user to learn. At step 120, a pre-assessment profile may be generated for a learner for the designated activity. The pre-assessment profile may enable the system to better customize activity steps and/or media types for a user, as further disclosed herein. At step 130, a plurality of activity steps may be generated; such that the plurality of activity steps provide prompts to the learner, which, in part or as a whole, enable a learner to complete a designated activity. The plurality of activity steps may include chronological step-by-step directions for a user to perform the components of the designated activity. At step 140, media types for each activity steps of the plurality of activity steps may be identified, based on the an optimal use of resources available, a pre-assessment profile for the learner, and the designated activity. The media types may include, but are not limited to one or more or a combination of video, image, audio, text, force feedback, touch, vibrations, haptic signals, hologram, augmented reality, virtual reality, or the like.

At step 150, the plurality of activity steps are provided to the learner via an output device, based on the identified media type. The activity steps may be provided to the user based on any applicable activation such as a user command provided via a device, a voice command, a tap, a gesture detected by a sensor or device, or the like. The activity steps may be provided based on a user's input or may be based on a third party's input such as a device (e.g., transceiver, mobile device, wearable device, medical device, electronic device, mechanical device, haptic device, sensor based device, visual device, audio device, interactive device, or the like, etc.) or another person. The activity steps may be provided to the learner via an output device which may be any device including, but not limited to, an electronic device, a mobile phone, a tablet, a television, a wearable device (e.g., smartwatch, smart glasses, haptic vibration device, etc.), or the like. The output device may be selected based on available resources and based on the identified media type. The activity steps may be provided such that the learner receives one step at a time. At step 160, feedback information based on the learners performance of the plurality of activity steps may be received. The feedback information may be generated automatically based on input from a device or may be input by a third party. At step 170, the learner's ability to perform the designated activity may be assessed based on the feedback information. The assessment may be made based on one or more factors such as, but not limited to, the number of activity steps mastered, the media type required or used, or the like, as further disclosed herein.

Referring back to FIG. 1 with additional details, as shown at step 110, a designated activity to be completed by a learner may be received. The designated activity may be selected for a given learner based on the learner's pre-assessment profile. Alternatively or in addition, the designated activity may be selected based on input by the learner or by a third party. For example, an instructor, caregiver, spouse, or employer may select the designated activity for the learner via any applicable manner such as via the same mobile application via which activity steps are provided to a learner, as further disclosed herein. According to an implementation a designated activity may be requested by or provided to a learner as a result of a trigger such as by a device (e.g., transceiver, mobile device, wearable device, medical device, electronic device, mechanical device, haptic device, sensor based device, visual device, audio device, interactive device, or the like, etc.) a sensor, an audio signal, a movement, or the like or a combination thereof. For example, any device, service, or combination thereof may determine that one or more set of conditions are met such that the result of such condition is to provide the user with a designated activity. A learner may be able to obtain designated activities via a download, scan, or other form of obtaining information. For example, a code or signal (e.g., QR code, barcode, NFC signal, RF signal, etc.) may be provided to a learner such that the learner may scan the code or receive the signal. A version of a designated activity may be provided to the learner. The version of the designated activity may be selected based on the learner's personal profile, as disclosed herein, location information, environment, health, vitals, time, or the like. As an example, an indication such as a logo or image may be provided next to codes or signal areas such that the user may be able to identify the logo or image and obtain a designated activity by activating her device near the indication. A learner or other individual may activate designated activities based on voice commands or by providing other applicable input such as via a gesture or other interaction with a button or touch selection via a device.

A designated activity may be any activity that is to be performed by a learner, whether disabled or able bodied, and may include activities such as, but not limited to, making a drink, using the toilet, going to airport, taking a flight, going food shopping, going clothes shopping, using a dishwasher, washing dishes, washing clothes (e.g., using washer, dryer, folding), playing a game, operating a machine, waiting, going to laundromat, using transportation (e.g., car, bus, taxi, train), driving a car or other vehicle, riding in a car or other vehicle, using machinery, riding a bicycle, using a computer, surfing the internet, walking a pet, feeding a pet, going to a sports venue, going to a park, going to a mall, going on a boat or cruise, going to a restaurant, going to an amusement park, making a phone call, cleaning a table, preparing a meal, packing a bag (e.g., school bag, travel bag, toiletry bag), making a bed, setting an alarm, using a photocopier, filling a glass, cleaning up (organizing) toys, making a purchase, using the microwave, exercising, writing their name or other item, navigating streets (e.g., intersections in streets, signs), selecting clothing based on weather, selecting activities based on time of day (e.g., wear pajamas at night), tying shoelaces, checking expiration dates on items (e.g., food), performing tasks at work, cleaning the floor (e.g., mopping, vacuuming), dusting (e.g., furniture, appliances), putting clothes on and taking off clothes, taking turns with other people, using media equipment, using a key (for a house door, vehicle door, etc.), securing the home from within or when leaving the home, brushing teeth, washing face, body cleansing (e.g., showering, bathing), going to school or other learning facility, going to hospital, taking medicine (e.g., liquid, pill, injection, inhaler, eye drops), going to movies, going to a venue with crowds (many people), performing sports activities, going to beach, or the like or any combination thereof. Essentially, any task to be learned may be subject to the techniques disclosed herein.

Figure 3A:
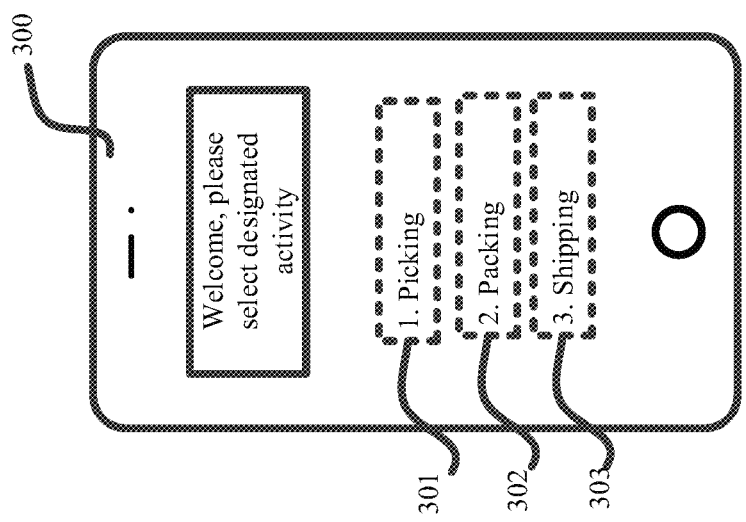
FIG. 3A is a diagram for selection of designated activities.

As shown in FIG. 3A, a mobile device 300 may provide a plurality of designated activities 301 through 303 based on a given learners personal profile as well as an indication that the given learner is applying for an employment position at a fulfillment center, such that the designated activities 301 through 303 correspond to activities specific to employment at the fulfillment center. The activities 301 through 303 may be provided based on the users ability to perform such activities based on the pre-assessment profile. Alternatively or in addition, the activities 301 through 303 may be provided based on the duties required to perform the activities required to obtain and/or maintain employment at the fulfillment center. The user or an employer may select one or more of activities 301 through 303, for example, at the beginning of a training period.

Referring back to FIG. 1, as shown at step 120, a pre-assessment profile may be generated for a learner for a given designated activity. The pre-assessment profile for a learner based on a given designated activity may be based on inputs provided by the learner or may be based on inputs provided by a third party instructor and/or third party system. The inputs may be based on inquires presented to a learner, signals from electronic devices, video analysis, audio analysis, or may be based on observational data gathered based on tasks completed by a learner. The pre-assessment profile may be unique to a given learner such that the pre-assessment profile for a first learner may be different than a pre-assessment profile for a second learner. According to an implementation, the pre-assessment profile may not be provided and may be optional.

As non-limiting examples, the pre-assessment profile may be created based on a learners cognitive ability, previously obtained diagnosis, motor skills, age, support level, and/or instruction following ability. As an example of cognitive ability, a learner may receive a series of prompts on her mobile device and may provide responses to those prompts. The prompts may be questions with, for example, multiple-choice answers. Alternatively, the prompts may be, for example, games or other activities, which require the learner to interact while their interaction is recorded and/or analyzed. The responses to or interaction with the prompts may be analyzed using a processor. The processor may generate the pre-assessment profile based on predetermined criteria or may generate the pre-assessment profile based on evaluation of the responses/interaction in relation to each other.

Figure 2:
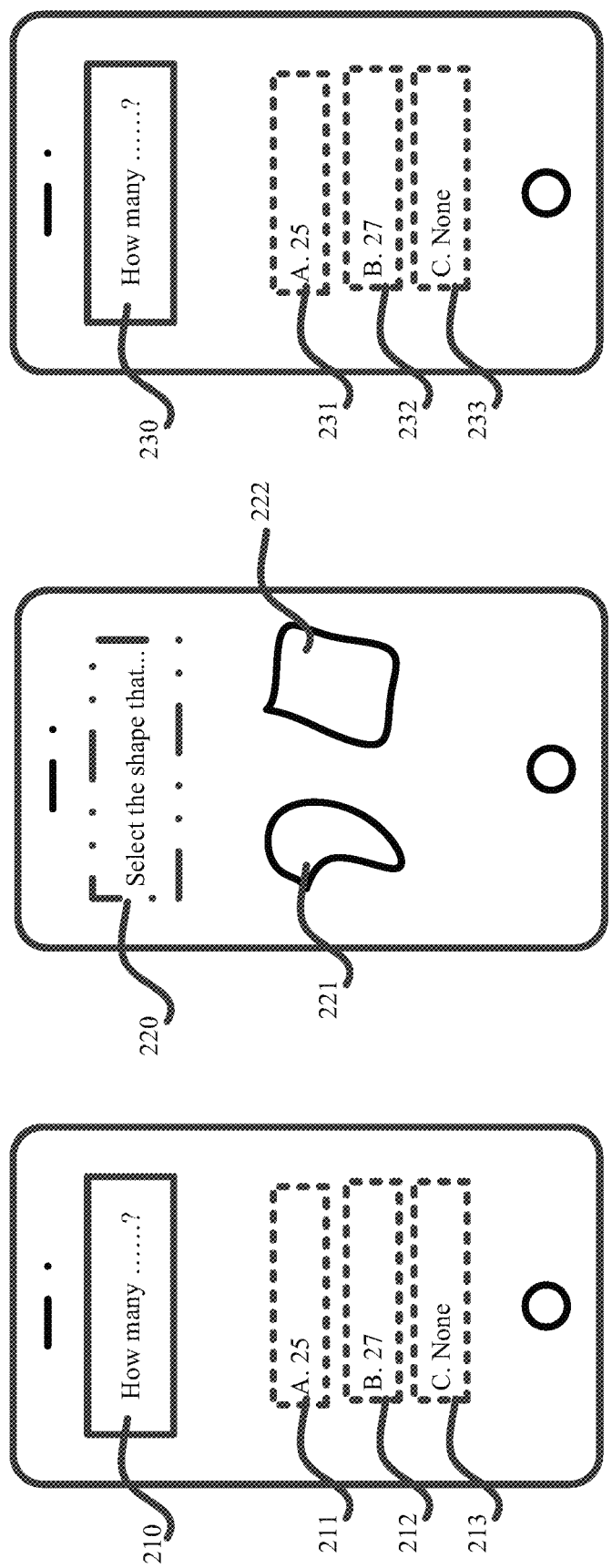
FIG. 2 is a diagram for various prompts to determine a pre-assessment profile.

As shown in FIG. 2, a user may receive a number of prompts, such as prompts 210, 220, and 230, via a mobile device 200. The prompts may be, for example, multiple choice prompts such as prompt 210 such that the user may be requested to select from response 211, 212, or 213. Alternatively or in addition, for example, the prompts may be interactive prompts such as prompt 220 such that a cue may be provided to a learner. The cue may disappear, and may be followed by an interactive task to be completed via interaction with component 221 and/or 222.

Alternatively or in addition, for example, the prompts may be iterative prompts such as prompt 230 which may be generated based on the users provided input to a previous prompt (e.g. prompt 210 or 220) such that a first prompt (e.g., prompt 210 or 220) may provide an initial baseline and a second prompt (e.g., prompt 230) may build upon or modify that initial baseline. Using an iterative prompt may provide robust information, which uses time as a factor, at least in part, in order to generate a pre-assessment profile. As a non-limiting example, the learner may provide answers to a multiple choice prompt 210 at a first time. A week later, the learner may be provided the same or similar prompt 230 with multiple choice responses 231, 232, and 233, and the system my generate a pre-assessment profile based at least in part on the similarity or difference in the response to the first prompt 210 and second prompt 230. In this example, a learners ability to provide consistent responses or to modify responses based on slightly different prompts may provide an indication of the user's overall ability and, thus, may contribute to the pre-assessment profile.

According to an implementation, the processor may receive data regarding the response/interactions and/or pre-assessment profiles of other learners and may factor such information when generating the pre-assessment profiles. The pre-assessment profiles of other learners may be for the same designated activity, similar designated activity, or other designated activity. The data regarding the responses-interactions and/or pre-assessment profiles of other learners may be encrypted and/or may be striped of identifying information.

The pre-assessment profile may include optimal media type preferences for the learner. An optimal media type preference may indicate a media type that the given learner learns better with (e.g., audio, hologram, augmented reality, virtual reality, video, video+audio, video+text, audio+text etc.). Alternatively or in addition, the optimal media type preference may indicate a media type for given activity steps or activity step types. For example, the pre-assessment profile may indicate that a learner prefers video based instruction for activity steps that include physical motion whereas the learner prefers text based instructions for activity steps that include only non-physical (e.g., mental) components. The indication by a pre-assessment may be made based on an analysis of the inputs provided when completing the pre-assessment profile such as, for example, by the learner, as shown in FIG. 2. The analysis may include comparing the inputs to pre-stored data, to the responses from other learners, or the like. The pre-assessment profile for a given learner may be updated based on continuous use of the system by the given learner for the designated activity associated with the pre-assessment profile. For example, the media type preference for the learner may be updated based on assessing the learners ability to perform the designated activity one or more times, as further disclosed herein.

Referring back to FIG. 1, at step 130, a plurality of activity steps, which break down a designated activity, may be generated. The plurality of activity steps may each include one or more prompts which are provided to the learner. The completion of each activity step, as an aggregate, may result in the completion of the designated activity. The activity steps may be generated based at least in part on the pre-assessment profile of a learner. As a non-limiting example, the pre-assessment profile of a first learner may indicate that the learner is capable of creating a three-dimensional box from a cardboard cutout with perforated edges. This first learner's pre-assessment profile may include such an indication based on, for example, a high level of motor skills associated with the first learner, exhibited through interactions with prompts, as described herein. For this first learner, the activity steps for the designated activity of shipping an ordered product may include:

1. Review an order slip for a product located at a bin location
2. Retrieve the product from the bin location
3. Create a box from a perforated cardboard cutout
4. Place the product in the created box
5. Apply a shipping label
6. Place the box with the shipping label in a shipment location Alternatively, as a non-limiting example, the pre-assessment profile of a second learner may indicate that the learner is not already capable of creating a three-dimensional box from a cardboard cutout with perforated edges. This second learner's pre-assessment profile may include such an indication based on, for example, a low level of motor skills associated with the second learner, exhibited through interactions with prompts, as described herein. For this second learner, the activity steps for the designated activity of shipping an ordered product may include:

1. Review an order slip for a product located at a bin location
2. Retrieve the product from the bin location
3. Place a perforated cardboard cutout on a flat surface
4. Bend the cardboard cutout at the perforated edges
5. Clasp the bent edges into each other to create a box
6. Place the product in the created box
7. Apply a shipping label
8. Place the box with the shipping label in a shipment location As shown, the number of activity steps that are generated for the first learner are less than the number of activity steps for the second learner. Such a distinction can be result of one or more factors such as, but not limited to, a pre-assessment profile or a designated activity.

At step 140, a media type may be selected for each activity step of the plurality of activity steps. The media type may be based on the availability of resources, the availability of output devices, and/or one or more connections as well as the pre-assessment profile of a learner, a given activity step, a designated activity, or the like, or a combination thereof. The media type may be one or more of a video, audio, text, images, or the like, or a combination thereof. As a non-limiting example, a media type may be a video with an audio overlay such that the audio overlay describes the visuals provided in the video.

The media type may be selected based on the availability of hardware and/or software resources such that a learner is provided the activity step in an optimal/seamless manner. The hardware and/or software based selection of the media type may occur based on upload speeds, download speeds, access to one or more servers, access to one or more libraries, storage capability, streaming capability, or the like or a combination thereof. For example, activity steps may be stored as various media types across a distributed network. A determination may be made that a learners Wi-Fi connection is implemented with a firewall such that the files associated with a first media type cannot be provided to the learner. Accordingly, the first media type may not be selected, therefore ensuring that the learner is not prevented from receiving the given activity step. The media type may be selected based on the availability of output devices. For example, if a learner's available devices are not capable of providing a holographic image, then a media type that requires holographic images may not be selected, even if the user's pre-assessment profile indicates that the holographic images are the best media type for the learners improved performance. The media type may be selected based on one or more connections such as a connection between a learners device (such as device 1101 or 1102 of FIG. 11C) and a server (such as server 191, 193, or 195 FIG. 11C) and/or a library (such as library 192, 194, or 196 FIG. 11C), and/or an internet connection. A determination may be made regarding the speed or efficiency with which a given media type can be obtained from a server or library and such a determination may be a factor in the selection of the media type.

The media type may be selected based on the pre-assessment profile such that an activity step is provided to a learner via the optimal media type that may enable that learner to master the activity step. The optimal media type may be determined based on an analysis of the inputs provided when completing the pre-assessment profile such as, for example, by the learner, as shown in FIG. 2. The analysis may include comparing the inputs to pre-stored data, to the responses from other learners, or the like. Accordingly, the media type selected for a first leaner, for a given activity step, may be different than the media type selected for a second learner, for the same given activity step.

At step 150 of FIG. 1, activity steps may be provided to a learner based on the selected media type, as disclosed herein, and/or based on an output device selection. The output device may be selected based on the type of media type such that, for example, if the media type is a video, then a device that plays video may be selected. Additionally or alternatively, an output device may be selected based on the pre-assessment profile or a learners personal profile such that an output device that provides an optimal performance of the activity steps by the learner is prioritized over an output device that does not. For example, a television and a mobile phone may both be capable of providing a video activity step. However, a determination may be made based on a learner's past performance that the learner has performed better when viewing a video on a television when compared to a mobile device. Accordingly, the television may be selected as the output device. Additionally or alternatively, resource limitations or optimization may be a factor in selecting an output device. The resource limitation or optimization may be based on device capability, communication systems, access rights, library settings, or the like or a combination thereof. For example, if the amount of bandwidth available to download a video is limited, a determination may be made that the learner will be provided a uninterrupted video on her mobile phone due to the smaller size of the video file for the mobile phone, when compared to a lagging video on her television due to the larger size of the video file for the television. Accordingly, the mobile phone may be selected as the output device to ensure uninterrupted delivery of the activity step.

Activity steps may be conveyed to a learner in varying level of details based on the selected media types. Notably, a first media type may provide more information or more detailed information than a second media type. Different media types may be allocated a graded value such as, for example, found in Table 1 below. It will be understood that Table 1 is an example only. Additional media types may be applicable such as vibration based media types for an individual who may not be able to view an image and/or video. Media types may all include text or may be paired with text to create a first media type and may not be paired with text to create a second media type. It will be understood that although a media type that provides a greater amount of information (e.g., video) is shown to have a higher graded value than a media type that provides a lesser amount of information (e.g., image), the graded values may be applied in any manner that shows a difference between the media types and maintains a relationship between designated greater information vs lesser information.

TABLE 1

| Media Type | Graded Value |
| --- | --- |
| Image or Text only | 1 |
| Audio only | 2 |
| Audio + (image and/or text) | 3 |
| Video only | 4 |

The graded values for a media type may be used to establish a baseline value and/or to track a combined number of prompts provided to a learner or required by the learner to perform a designated activity. For example, the combined graded value for a first designated task that requires to activity steps with audio only (3+3) and one activity step with video only (4) may be 10 based on the graded values for the audio only and video only media types, as provided in Table 1. As further disclosed herein, the graded value for a given activity step or the combined graded value for a designated activity for a given user may be tracked over time to determine the progress, over that time period, that the learner has made. Such graded values or combined graded values may also provide an indication regarding a learners overall ability to perform one or more designated activities as well as the learners overall duration of learning designated activities. An analyzed graded value may be a value that is calculated by applying the graded values to a predetermined equation. For example, an analyzed graded value may be the sum of all the graded values, the average of the graded values, a different calculation, or the like. According to an implementation, the graded values or analyzed graded value for a designated activity may enable the scheduling of assessment dates such that a learner is provided an applicable amount of time prior to an assessment based on an analysis of the change in graded value/analyzed graded value. As an example, the training period for an employment candidate may be determined based on an analysis of the reduction in cumulative values for the candidates, based on past experience. Such a custom training period may enable the candidate to not feel rushed or disappointed due to, for example, training periods that are too short.

Figure 3B:
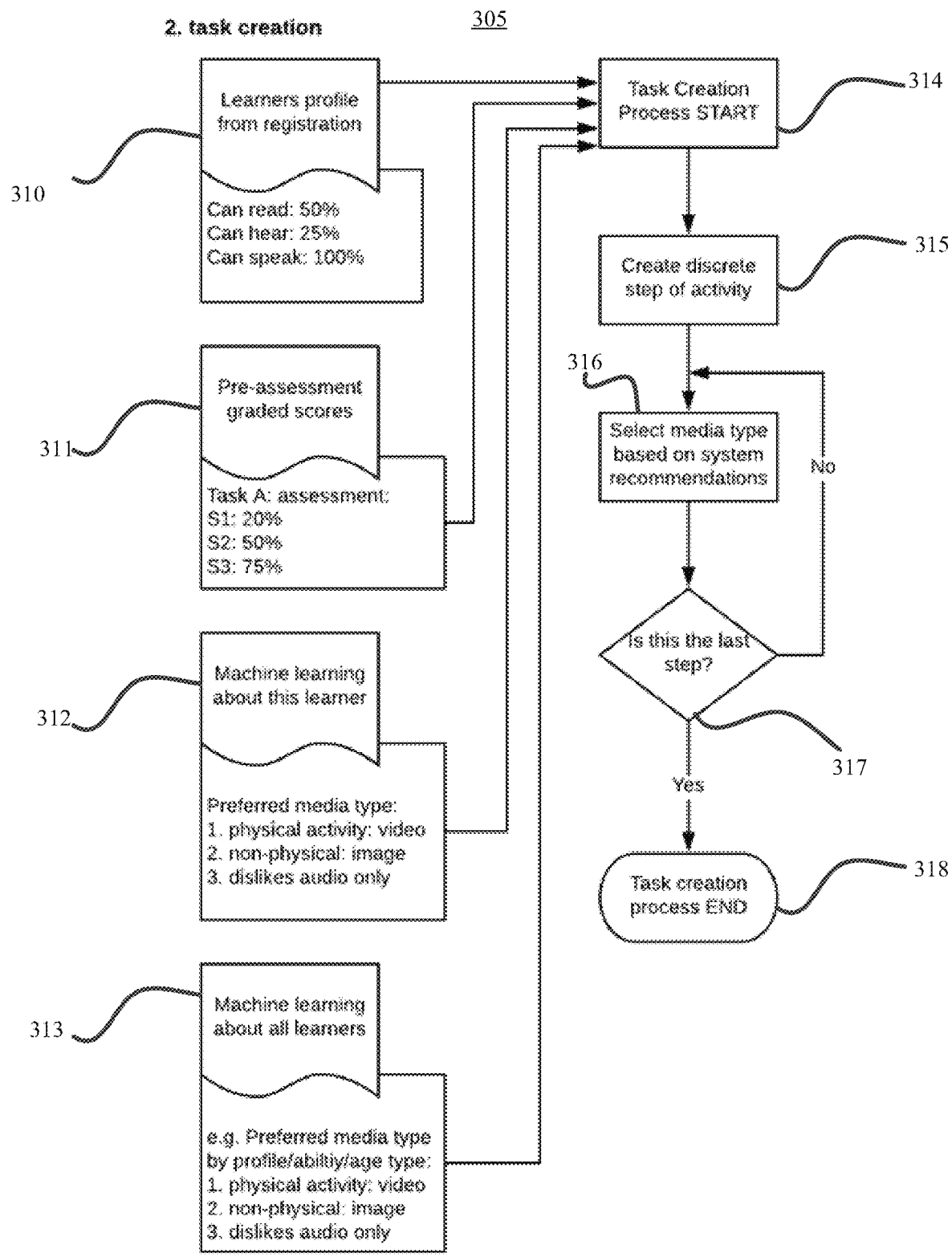
FIG. 3B is a flowchart for a task creation process.

FIG. 3B shows an example flow chart 305 for the creation of activity steps. The activity step creation process may initiate at step 314. The activity step creation process 314 may be self-reliant such that it is not based on any input. Alternative, as shown in FIG. 3B, the activity step creation process 314 may be based on one or more inputs such a learners personal profile 310 (also referred to as a learner's registration profile", a pre-assessment 311, a machine learning input 312, and third party information 313. According to an implementation, the activity step creation process 314 may be predefined and the predefined activity steps may be amended based on one or more of the learner's personal profile 310, a pre-assessment 311, a machine learning input 312, and third party information 313. The learners personal profile at 310, and as further disclosed herein, may include information about the learner such as, for example, the learners ability to read, to hear, to speak, as shown. The pre-assessment profile 311 may be based on the learner and the specific designated activity for which the activity steps are being generated. It may include an assessment of the prompts and responses such as those provided in FIG. 2. Machine learning input 312 may include information learned about a learner over the course of the learner's interaction with the system. The interaction may be, for example, the learner's use of the system to learn one or more other designated activities and the corresponding response and progress for those activities.

The machine learning input 312 may include media type preferences for types of activity steps and/or designated activities, as shown. Third party information 313 may include, for example, a machine learning analysis of information gathered based on the performance of other learners' interaction with the system. The interaction may be, for example, the other learners use of the system to learn one or more designated activities and the corresponding response and progress for those activities. The third party information 313 may include media type preferences for types of activity steps and/or designated activities, based on media type preferences that have shown to be successful for other learners.

The third party information 313 may be applied to a given learner's activity step creation process based on a comparison of one or more demographic factors of the given learner such that, for example, third party information 313 only includes information regarding other learners that are in the same age group as the given learner.

At step 315, activity steps may be generated based on the inputs provided at step 314. At step 316, media types may be selected for all or one of the activity steps created at step 315. The media types may be selected based on the information collected at step 314 which is based on the learners personal profile 310, a pre-assessment 311, a machine learning input 312, and/or third party information 313. At step 317, a determination may be made regarding whether the activity step for which a media type was allocated is the last activity step. If the activity step is not the last activity step, then the system loops back to step 316 such that a media type is selected for the next pending activity step. If the activity step is the last activity step, the activity step process terminates at 318.

As shown at step 160, feedback information based on a learners performance of a plurality of activity steps may be received. According to an implementation, feedback information may be automatically gathered based on one or more sensors capturing data regarding a learners performance of activity steps. The one or more sensors may include motion sensors, accelerometers, near field communication sensors, wireless sensors such as Wi-Fi, Bluetooth, infrared, etc., GPS sensors, heart rate sensors, height sensors, impact sensors, or the like. The one or more sensors may be activated and/or may gather feedback information based on when one or more activity steps are provided to a learner in an applicable media format. As a non-limiting example, a motion sensor and impact sensor may be activated and may begin to gather information when a user is provided a text only activity step, which states "Pick up product from bin and place on desk". The motion sensor may gather feedback information regarding the location of the user with respect to the bin and the impact sensor may gather information regarding a placement, or lack of placement, of the box when the motion sensor determines that the learner is located at the applicable desk.

According to an implementation, feedback information may be gathered based on learner input or input by a third party who may observe the performance of the learner. A learner and/or a third party may provide input regarding the performance of a designated activity and/or activity steps associated with the designated activity. The input may be binary such that the learner and/or third party inputs whether a designated activity or given activity step(s) were successfully completed. Alternatively or in addition, the input may provide information regarding the quality of the performance of a learner. For example, the input may rate the speed, completeness or other attribute regarding the completion of a designated activity or given activity step.

According to an implementation, the feedback information may include or may be based on past feedback information. Feedback information at a current time may be updated based on and/or compared to feedback information that was captured at a time prior to the current time. For example, a learner may complete a designated activity within 3 minutes. This time may be compared to a previous completion of the designated activity where the learner completed the designated activity within 4 minutes. Accordingly, the feedback information may include, at least a designation that the learner has completed the designated activity within a time period that is shorter than a previous time period for completion of the same designated activity. The feedback information may also further include the two time periods, the difference in time periods, a trend that compares multiple sets of feedback information, or the like.

Figure 4:
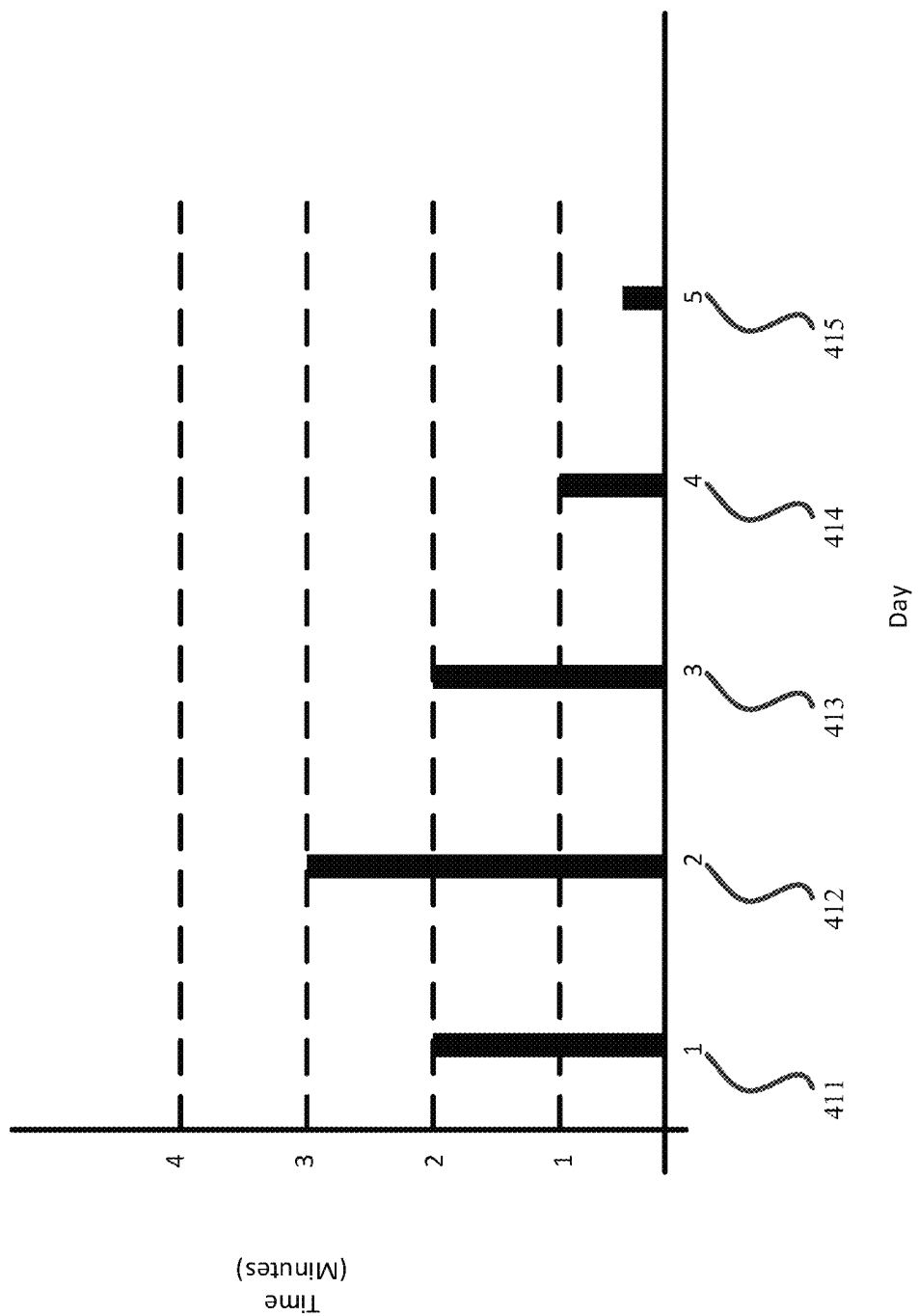
FIG. 4 is a diagram that shows feedback information for task completion.

FIG. 4 shows an example chart 400 generated based on feedback information stored for a given learner. As shown, chart 400 includes multiple days 411, 412, 413, 414, and 415 on the x-axis, which correspond to different times when a learner performed an activity step. Chart 400 includes the amount of time it took for the learner to complete the activity step, on the y-axis, for each of the multiple days 411, 412, 413, 414, and 415. As shown, on a first day 411, it took the learner 2 minutes to complete the activity step. On the second day 412, it took the learner 3 minutes to complete the activity step. On the third day 413, it took the learner 2 minutes to complete the activity step. On the fourth day 414, it took the learner 1 minute to complete the activity step and on the fifth day 415, it took the learner 30 seconds to complete the activity step.

According to an implementation, designated activities, activity steps, media types, and/or feedback information may be stored locally or may be stored at a remote location such that they can be accessed locally. They may be stored as part of a library such as a closed library or an open and shared library in whole or in part, according to one or more criteria. One or more organizations and/or individuals may manage and/or enhance such a library such that the library can grow over time and with more available data. Patterns and other such data (including derived data) which may enable the system to better determine applicable designated activities, activity steps, media types, efficiencies, approaches, or the like may also be shared in such a library and may be stored locally and/or at a remote server, and may be accessed publicly or privately or in a semi-private fashion, as disclosed herein.

As shown at step 170, a learner's ability to perform the designated activity and/or activity step may be assessed, based on the feedback information. The assessment may be made by the system based on an analysis of the feedback information. Alternatively, the assessment may be made based on providing the feedback information to the learner or a user. The feedback information may be analyzed, formatted, synthesized, and/or otherwise modified prior to being provided to the learner or a user. For example, the chart 400 of FIG. 4 may be generated and provided to a learners trainer and may further indicate that the user meets the predetermined criteria of completing the particular activity step shown in chart 400 in less than one minute for at least two different consecutive days.

An assessment may be made based on predetermined criteria which may be stored locally, input by a user or the learner, input via a one or more sensors, or stored at a remote location such as a remote server. Similar to the example provided above, a learner's trainer may pre-determine that a training criterion for a learner is to complete the particular activity step shown in chart 400 in one minute or less for two consecutive dates in a row. Accordingly, an assessment that the learner satisfies these training criteria may be made for the learner of the example shown via chart 400, based on the learner completing the activity step in one minute or less for consecutive dates 414 and 415.

Alternatively or in addition, the assessment may be made based on criteria that are automatically generated based on one or more attributes related to the learner, the designated activity, the environment or surrounding, the activity step, and/or the like. An assessment based on criteria that are automatically generated may provide insight into the progress of a learner's ability to perform a designated activity or activity steps associated with the designated activity. According to an implementation, the automatically generated assessment may not be tied to specific criterion provided by a user or learner, as disclosed above. For example, an assessment may be automatically generated upon completion of a designated activity. For example, an assessment may be made after each time that a learner completes an designate activity and may be provided to the learners supervisor. Alternatively, an assessment may be automatically generated upon a change in performance. For example, an assessment may be made any time a learner improves her performance above a given threshold or when the learners performance falls below a given threshold. Such information may be provided to a caregiver such that the caregiver can more appropriately provide care for the learner based on such assessment. Such information may be provided to a caregiver in any applicable manner such as via a mobile application, such as the mobile application that provides the activity steps to a learner. A learner such as, for example, an able bodied learner may elect to assess herself and, accordingly, assessment information may be provided to the learner herself.

According to an implementation, the assessment may be based on a machine learning system that utilizes a pre-assessment profile, personal profile, past performance, and or goal performance and generates an output based on one or more of the same.

According to an implementation, one or more activity steps for a designated activity may be modified based on a learners performance. The modification may be to remove the activity step, to change the media type for the activity step to one with a higher graded value, to change the media type for the activity step to one with a lower rated value, or to add an activity step. The modification of the activity step may be based on the assessment of a learner's performance of the activity step and/or designated activity, as disclosed herein. For example, a media type for an activity may be changed to one with a higher graded value if a learner exhibits difficulty in learning the activity step. As another example, a media type for an activity may be changed to one with a lower graded value if the learner has learned or has indicated that she is in the process of learning the activity step.

Figure 5:
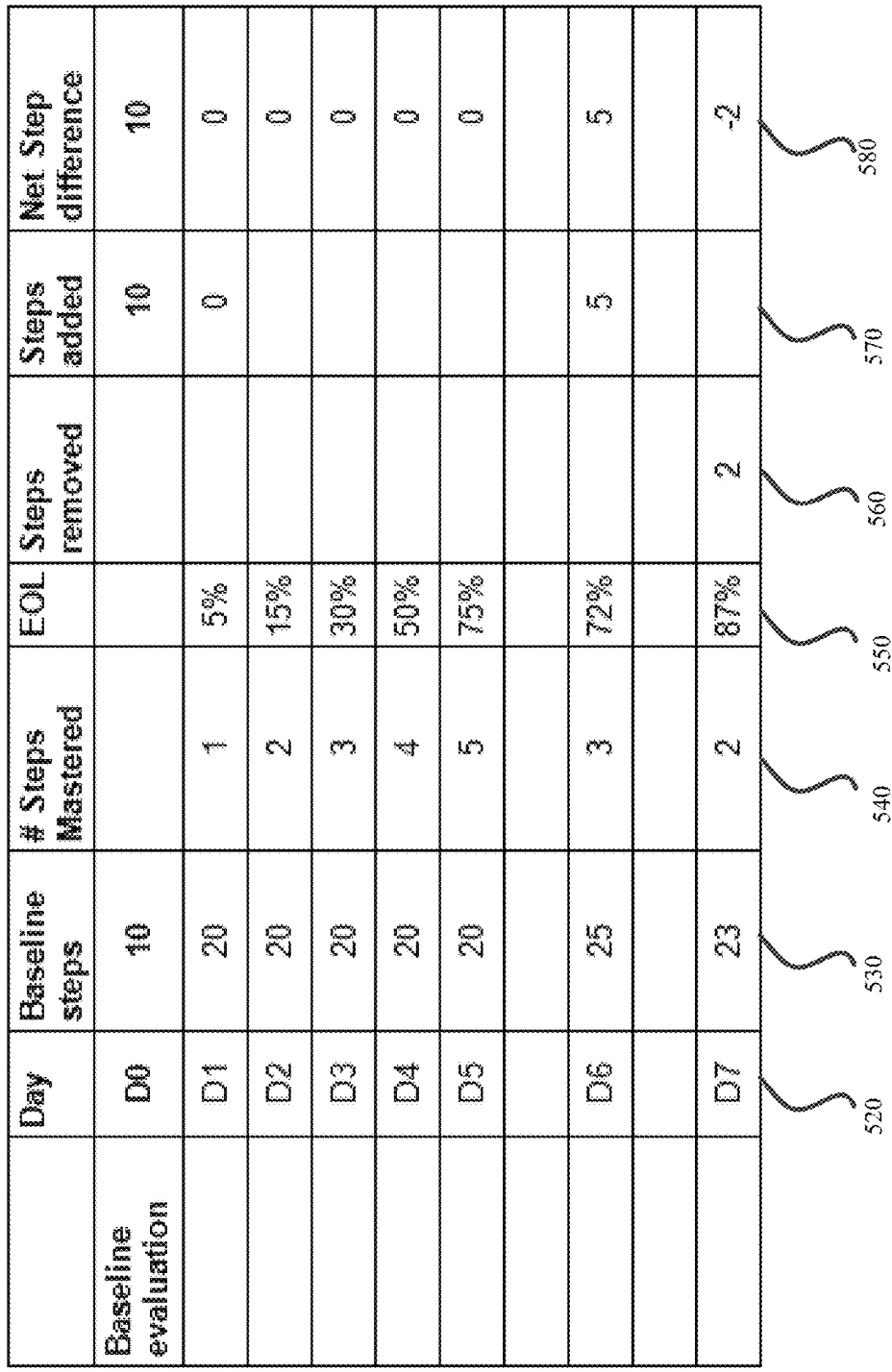
FIG. 5 is a chart that shows Evidence of Learning (EOL)

FIG. 5 shows an example chart 510 which shows a learners performance related to a Designated Activity 1. Column 520 indicates the day, column 530 indicates the number of activity steps provided to a learner, column 540 shows the number of steps mastered on the given day from column 520, column 550 shows the Evidence of Learning (EOL), as further discussed herein, column 560 shows steps removed, column 570 shows steps added, and column 580 shows the net difference in steps. As shown, a baseline evaluation may be conducted on Day 0 such that a baseline number of activity steps for the designated activity may be determined to be 10. An additional 10 steps may be added based on, for example, a pre-assessment profile for the learner for Designated Activity 1. Alternatively or in addition, the additional 10 steps may be added based on a system indication that the 10 additional steps are generally required for learners who are seeking to learn the designated activity. Accordingly, a total of 20 activity steps may be provided the learner on Day 1. As shown, the user may master 1 step on Day 1 which may correspond to an Evidence of Learning (EOL) of 5% where the EOL score is set to $1/20*100=5\%$. On Day 2, the user may master 2 additional steps such that the EOL score is set to $(1+2)/20*100=15\%$. On Day 3, the user may master 3 additional steps such that the EOL score is set to $(1+2+3)/20*100=30\%$. On Day 4, the user may master 4 additional steps such that the EOL score is set to $(1+2+3+4)/20*100=50\%$. And, on Day 5, the user may master 5 additional steps such that the EOL score is set to $(1+2+3+4+5)/20*100=75\%$. According to this example, by Day 5, the learner will have mastered 15 activity steps with an EOL of 75%. An EOL score may be all or part of the feedback information, as disclosed herein. The EOL score may be provided and may be used to assess the progress of the user. The EOL score may also be used to determine mastery and/or fluency of a designated activity, as disclosed herein.

According to an implementation, activity steps for a designated activity may be added or removed. The activity steps may be added or removed based on one or more predetermined criteria or may be removed by the learner or another user. For example, a caregiver or coach may view a learners performance of the activity steps and may add or remove activity steps based on her observations. Continuing the example of FIG. 5, after Day 5, a coach may add five activity steps, as shown. On Day 6, the user may master 3 additional steps such that the EOL score is set to (1+2+3+ 4+5+3)/25*100=72%, where the total number of activity steps changed from 20 to 25. The coach may remove two steps after Day 6, such that the total number of steps changes from 25 to 23. On Day 7, the user may master 2 additional steps such that the EOL score is set to (1+2+3+4+5+3+2)/ 23*100=87%, where the total number of activity steps changed from 25 to 23. It will be understood that a first set of activity steps may be added and a different set of activity steps may be removed prior to an assessment. A net activity step change may be used such that the total number of activity steps used for the assessment after the change is determined based on the net change.

According to an implementation of the disclosed subject matter, progress, for a learner, may be determined by one or more of reducing prompts, modifying a number of steps, by performing an assessment, by identifying independence, by EOL, by the speed of performing an activity step or a designated activity, by reduction in frequency of use of activity steps, by the termination in use of the activity steps, or the like. A prompt may correspond to an activity step and a media type associated with the activity step. The reduction of a prompt may correspond to changing the media type of an activity step to a media type of a lower graded value. For example, the media type of an activity step may be changed from a video to a text prompt based on a facilitator's observation that the learner has performed the activity step with the video media type in a satisfactory manner. A facilitator or the system may determine, based on an assessment, that the learner has performed an activity step in a satisfactory manner. For example, a wearable device may be used to record a user's action as an activity step is provided to the user via a video media type. Based on the movement sensor and one or more other sensors, the wearable may determine that the user has performed the activity step within a predesignated amount of time and, accordingly, may assess that the user has made progress with the activity step.

According to an implementation of the disclosed subject matter, as disclosed herein, the media types associated with activity steps may be modified based on feedback information and/or an assessment of the progress of the learner.

FIG. 6A shows an example of prompt reduction in relation to a Designated Activity A which includes 10 steps at an initial time and two inactive steps, as shown in column 610. As shown at column 620, a pre-assessment score may be determined for each step such that the pre-assessment score may indicate the likely amount of detail that may be used to select an applicable media type for each activity step. Here, a high pre-assessment score may indicate that the user may be able to perform the corresponding activity step with a low amount of guidance such that a text media type may be selected. A low pre-assessment score may indicate that the user may perform the corresponding activity step with a higher amount of guidance such that a video media type may be selected. For example, the pre-assessment score for activity step 1 is 80 which is higher than the pre-assessment score for activity step 9, which is 90. As indicated in column 620, a media type may be allocated for each activity step based on the pre-assessment score. The media type for activity step 1 with the higher pre-assessment score is an image and the media type for activity step 9 with a lower pre-assessment score is a video.

Legend 601 provides the graded values that correspond to media types for use with the Designated Activity A. Column 621 includes the media types as selected based on the pre-assessment score and the legend 601. As shown in column 630, each activity step from column 610 may have an graded value allocated to it in column 630 and the graded value may correspond to the corresponding media type for the activity step. The learner may be provided the activity steps based on their media types, as provided in column 630 and indicated by V1. At column 640, an assessment may be made regarding a learners performance of the V1 activity steps. As shown, the learner may perform activity step 1 in a satisfactory manner such that activity step 1 may be marked as learned. Activity steps 2-10 may be marked as not learned. Activity steps 11 and 12 may be added based on one or more factors, as disclosed herein, and may be added automatically by the system or by a user. As shown in column 650 each activity step from column 610 may have an graded value allocated to it and the graded value may correspond to the corresponding media type for the activity step as updated based on the assessment provided in column 640. The activity step media type graded values of column 650 may be designated as V2. As shown, the media type for activity 1 may be reduced to a natural cue which has a lower graded value (0) when compared to the graded value for the image media type of activity step 1 at V1. The lower graded value may be a result of the assessment as provided in column 640 or may be based on one or more other factors.

For example, a facilitator may determine that the learner is performing activity step 8 efficiently, though not yet meeting the assessment threshold. Accordingly, the learner may modify the media type for activity step 8 from a video with a graded value of 4 to an audio only prompt, with a graded value of 2, as shown in column 650.

At column 660, an assessment may be made regarding a learner's performance of the activity steps of V2. As shown, the learner may perform activity steps 1-4 in a satisfactory manner such that activity steps 1-4 may be marked as learned. Activity steps 5-12 may be marked as not learned. As shown in column 670 each activity step from column 610 may have a graded value allocated to it and the graded value may correspond to the corresponding media type for the activity step as updated based on the assessment provided in column 660. The set of activity steps and corresponding media types with graded values are designated as V3, as shown in column 670. At column 680, an assessment may be made regarding a learners performance of the activity steps of V3. As shown, the learner may perform all activity steps in a satisfactory manner such that activity steps 1-12 may be marked as learned. As shown in column 690, each activity step from column 610 may have an graded value allocated to it and the graded value may correspond to the corresponding media type for the activity step as updated based on the assessment provided in column 690. As shown, V4 of 690 may indicate that all steps have the lowest graded value of 0, based on the learner performing all steps at a satisfactory level. It should be understood that although this example shows graded values changing based on an assessment, the graded values may change based on any other factor including, but not limited to a facilitator's review and assessment of the learner's performance. For example, the media type and corresponding graded value for an activity step may be modified even if the assessment results in a not learned determination. According to an implementation, the media type and corresponding graded value for a media type may be modified based on the amount of exposure a learner has to the particular activity step or designated activity. As a non-limiting example, a prolonged amount of exposure without a desired result may prompt changing the media type for an activity step.

The progression for learning a designated activity may vary for different learners. For example, a second learner may be provided the same initial activity steps and media types as those provided to the learner in the example of FIG. 6A. The second learner may progress differently than the original learner such that the graded values may change at different rates or by different amounts, the amount of time to learn all the activity steps may be different, a facilitator may modify media types differently, or any other attribute of the progression may change, based on the second learners performance.

FIG. 6B shows an evidence of learning (EOL) calculation based on the example provided in FIG. 6A. As shown in FIG. 6B, column 695 corresponds to an assessment order, 696 corresponds a date of change, 697 corresponds to the graded values associated with the activity steps provided to the user based on FIG. 6A, and 698 corresponds to a % change or EOL. As shown in column 697, the graded value is originally 26 and then reduces to 24, then to 17 and finally is 0. The corresponding EOL is 0%, 8%, 29%, and 100% where the 100% for the Assessment 4 corresponds to a evidence of learning all the activity steps. Note that this technique of calculating the EOL is different than the EOL calculation technique of FIG. 5.

According to an implementation, one or more criteria, such as EOL may be used to provide a mastery determination and/or a fluency determination (e.g., behavioral fluency determination), which may be made based on a learners performance of a designated activity. A learner may master a designated activity when the analyzed graded value associated with designated activity is below a mastery threshold, based on EOL, based on speed of completion, based on exposure, or the like. Mastery of a designated activity may indicate that the learner is able to reach a level of learning that indicates that the learner is able to perform the designated activity with minimal prompts. The mastery threshold may be determined based on a designated activity, the learners personal profile, or based on a third party designation. For example, an employer may designate the mastery threshold for one or more designated activities.

A learner may have fluency in a designated activity based on a fluency threshold such that the fluency threshold may be duration of time that the learner masters the designated activity and/or the fluency threshold is a number of iterations of performing the designated activity where the learner masters the designated activity. Fluency in a designated activity may indicate that the learner is able to reliably perform the designated activity and a fluency determination may be a higher designation than a mastery determination. The fluency threshold may be determined based on a designated activity, the learners personal profile, or based on a third party designation. For example, an employer may designate the fluency threshold for one or more designated activities.

Figure 7:
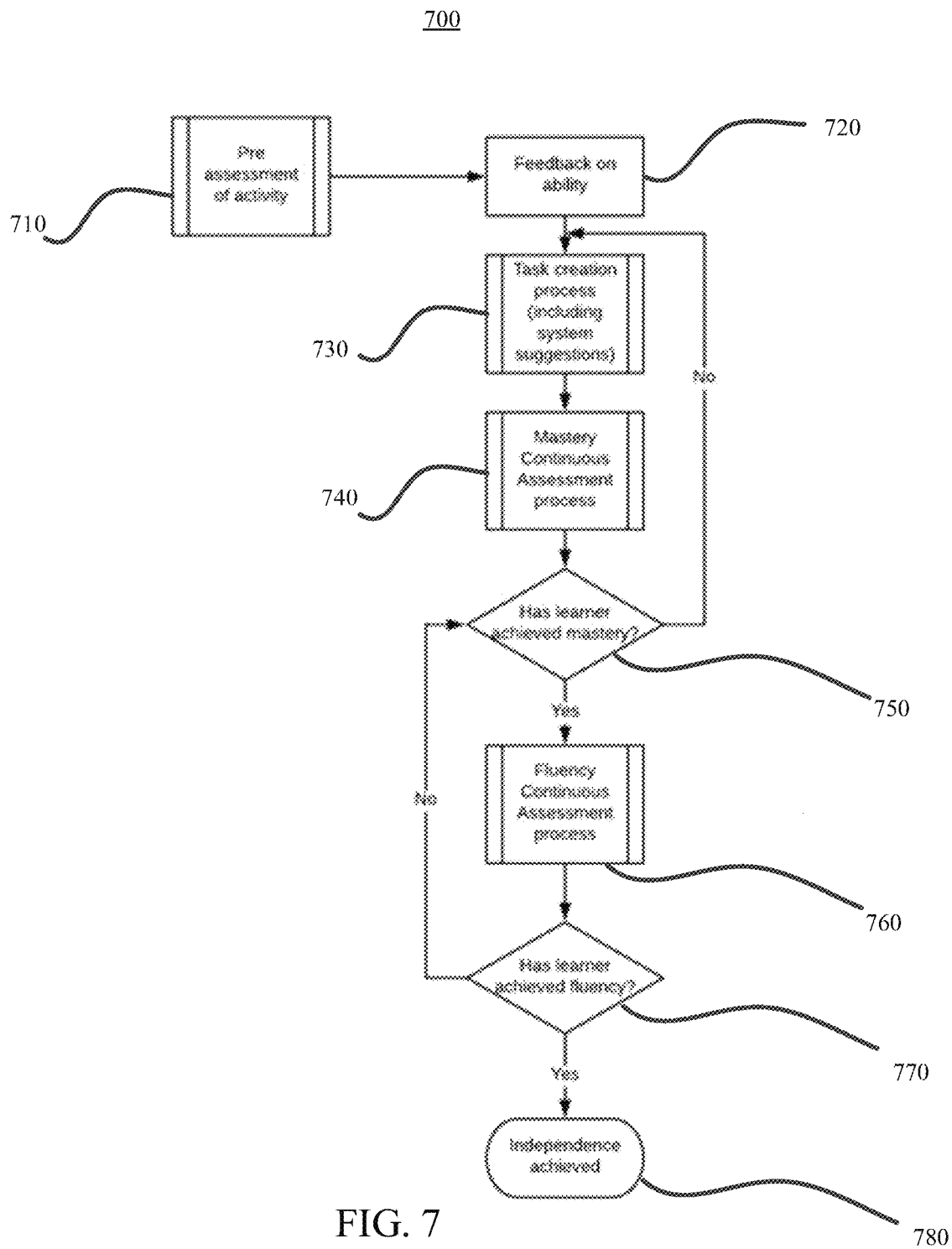
FIG. 7 is a flowchart for achieving independence.

FIG. 7 shows an flow chart 700 of an implementation in accordance with the disclosed subject matter. At step 710, a pre-assessment of a designated activity may be generated in accordance with the techniques disclosed herein. At 720, feedback information may be received based on a learner's performance of a designated activity. At step 730, one or more activity steps may be created based on the feedback information at step 720. For example, an activity step may be added, as shown in the example of FIGS. 5 and 6, to the set of activity steps in order to enable the learner to perform the designated activity. A step 740, a determination may be made regarding the mastery of a designated activity. A learner may master a designated activity based on an indication that the learner is able to reach a level of learning that indicates that the learner is able to perform the designated activity with minimal prompts, as further disclosed herein. At step 750, a determination may be made regarding whether the learner has mastered the designated activity. If the learner has not mastered the designated activity at step 750, then the system may loop back to step 730. It should be noted that FIG. 7 shows one technique for achieving independence. However, according to an implementation of the disclosed subject matter, one or more factors such as the designated activity, a learner's personal profile, an environment, a requirement, and/or the like or a combination thereof may be factors in determining the steps and requirements of independence. For example, independence may be achieved without steps 710 and 760 of FIG. 7.

If the learner has mastered the designated at step 750 of FIG. 7, then the system may make a fluency assessment at step 760. Fluency in a designated activity may indicate that the learner is able to reliably perform the designated activity and a fluency determination may be a higher designation than a mastery determination. At step 770 a determination may be made regarding whether the learner has achieved fluency in the designated activity, based on the assessment at step 760. If the learner has not achieved fluency, based on the determination at step 770, then the system may loop back to step 750. If the learner has achieved fluency, the learner may be designated as achieving independence for the designated activity, at step 780.

Figure 8:
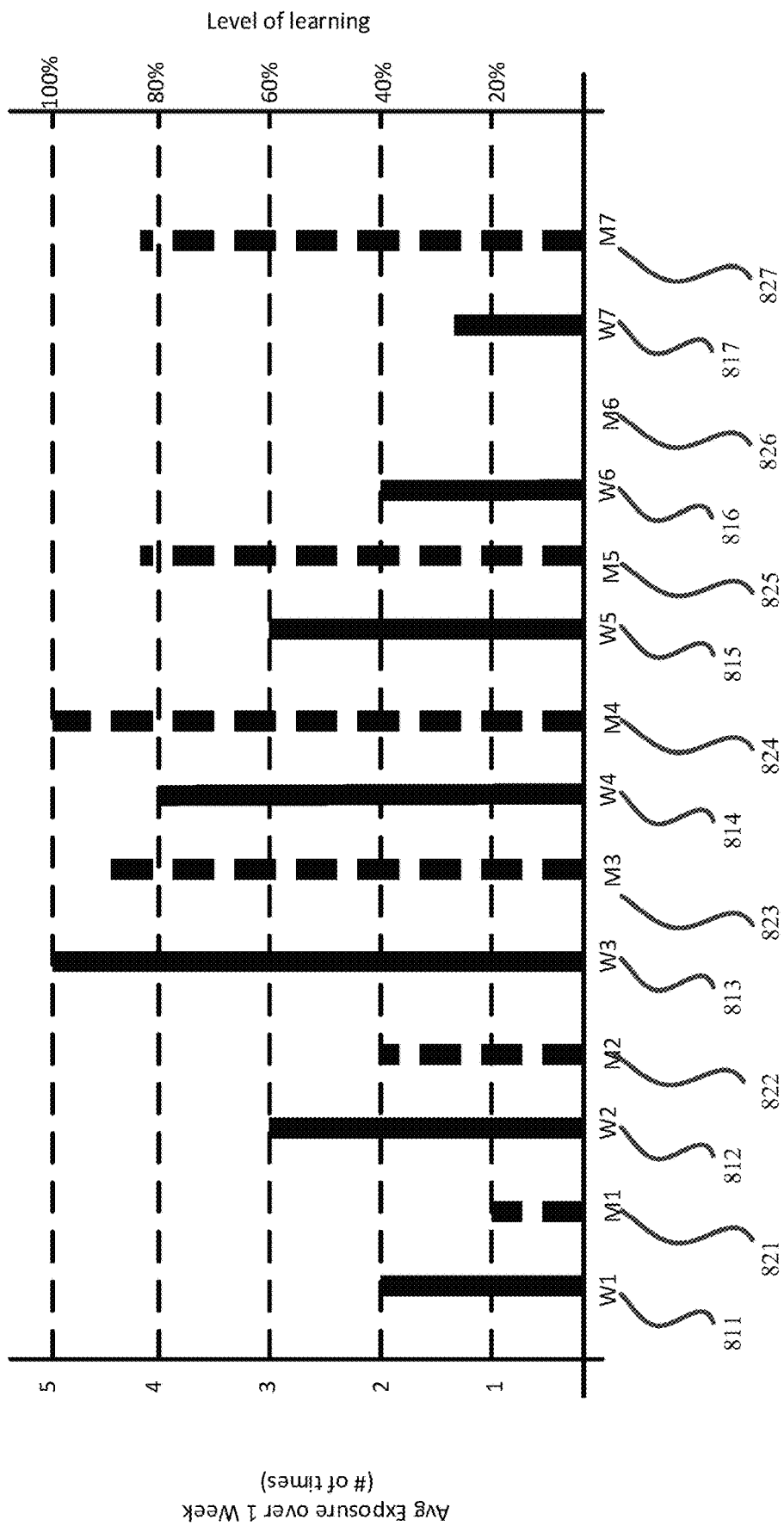
FIG. 8 is a chart that shows mastery and fluency.

FIG. 8 shows a chart which shows exposure, mastery and fluency for a learner. The solid lines corresponding to W1 through W7 (811, 812, 813, 814, 815, 816, and 817) indicate the amount of exposure that the learner has to performing a designated activity in a given week. The height of these solid lines correspond to the Y axis to the left of the solid lines which corresponds to an Average Exposure over 1 Week. For example, during week 1 (W1), the learner performs the designated activity two times and during week three (W3), the learner performs the activity 5 times. The amount of exposure that a learner has to a designated activity may be a factor in the assessment of the user in performing the designated activity. Alternatively or in addition, the exposure may be provided as part of the feedback information, as disclosed herein, and may allow a third party to gauge the process or made changes to a learner's activity steps. The mastery assessment times 821, 822, 823, 824, 825, 826, and 827 indicate a time after the completion of a corresponding week when a mastery assessment may be performed. The result of the mastery assessment is indicated by the dashed lines. The height of these dashed lines corresponds to the Y axis to the right of the dashed lines which corresponds to a level of learning.

According to an example, the mastery threshold for a system may be 80% such that a learner who shows a mastery of 80% of the activity steps for a designated activity may be considered to have mastered that designated activity during that assessment. As shown in FIG. 8, a mastery assessment may be performed after week 1, corresponding to M1 821 where the level of learning is 20%. At M2 822 the level of learning is 40%, at M3 823 the level of learning is 90%, at M4 824 the level of learning is 100%, at M5 825 the level of learning is 92%, no assessment is conducted at M6 826 and at M7 827 the level of learning is 92%. A mastery determination may be made based on the level of learning demonstrated by a user via an assessment. For the example shown in FIG. 8, the a mastery designation may be applied to M3 823 based on the learner achieving a level of learning of over 80%. According to an implementation, the mastery designation may be applied to a given assessment (e.g., M3 823), may apply to the learner once mastery has been achieved a single time, may apply for a given amount of time, or the like. A fluency determination may be made based on the user exhibiting a mastery determination for two or more times or for a duration of time. For example, a fluency determination may be made at M4 824 when the user receives a mastery designation for two assessments in a row and/or based on when the user does not drop below the 80% mastery threshold for two weeks in a row. A fluency designation may be associated with a learner whether or not the learner continues to provide assessments. For example, a learner may obtain a fluency designation at M4 824 based on consecutive mastery designations M2 822 and M3 823. The fluency designation at M4 may remain with the learner after the mastery assessment M4 824 such that even though the learner may not provide an assessment at M6 826, the fluency designation is not removed.

It will be understood that a fluency threshold may be different than a mastery threshold such that, for example, the mastery threshold may be 80% and the fluency threshold may be 90% such that a learner may achieve the mastery designation when the user performs at 80% and a fluency designation when the learner achieves 90% or more for a designated number of times.

According to an implementation, a learner may keep her fluency designation once such a designation is obtained or may lose her fluency designation based on one or more factors such as, but not limited to, duration of time, a level of learning below a threshold, a designation for a different designated activity, or the like.

According to implementations of the disclosed subject matter, a personal profile may be created for a learner. The personal profile may utilize one or more inputs, such as assessment algorithms, to record, suggest and create individualized learning environments including the assignment of content based on an individual learner's existing abilities and desired goals. The personal profile for a learner may utilize a feedback loop such that the personal profile may be updated based on updated or new information related to the learner. The personal profile may enable an efficient and effective selection and refinement of complex targeted learning content based on the learner's ability. The personal profile may be generated and/or updated based on a learners input, progress, change, or the like. Alternatively or in addition, the personal profile may be generated and/or updated based on a third party, such as a facilitator or an automated system. For example, a facilitator may receive information about the learner and provide the information such that the learner's personal profile is updated based on the information. As another example, the system may gather data from multiple sources including the behavior of other learners. Based on this data, the learner's personal profile may be updated/refined as the system may be able to better profile the learner based on learned behaviors, activities, outcomes, etc.

Figure 9:
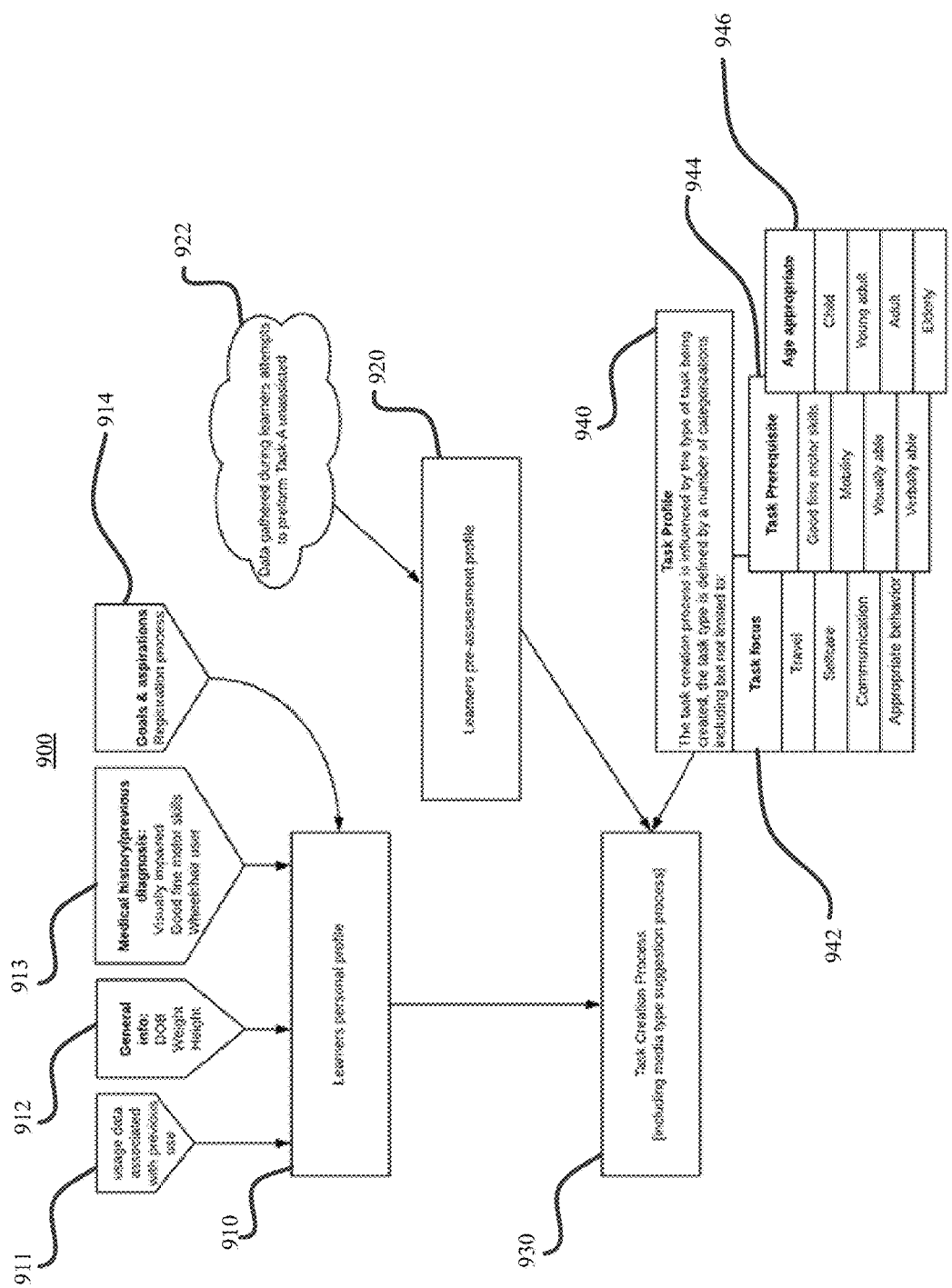
FIG. 9 is a diagram that shows the task creation process.

FIG. 9 shows an example diagram 900 which includes various factors that may be provided during an activity step creation process 930. A learner's personal profile 910 may be provided and may be based on usage data 911, general information 912, medical history/diagnosis 913, and goals 914. Additionally, a pre-assessment profile 920, as discussed herein, may be provided and may, in part, be based on data 922 gathered during the learner's attempt to perform a designated activity or activity steps without assistance. Additionally, a designated activity profile may be provided to the activity step creation process 930 and may include the task focus 942, task prerequisite 944, age categorization 946, as well as one or more additional inputs related to the designated activity.

A learners personal profile may be generated based on usage data 911. Usage data 911 may include, but is not limited to, a learner's learning of one or more designated activities using the system disclosed herein, the use of a device by a learner (e.g., transceiver, mobile device, wearable device, medical device, electronic device, mechanical device, haptic device, sensor based device, visual device, audio device, interactive device, or the like, etc.), or the like. For example, a learner may use the system and techniques disclosed herein to learn a number of designated activities. The learners personal profile may include data based on the users performance and surrounding activities related to learning those designated activities. Specifically, for example, the learners personal profile may include information about media type preferences, mastery time periods and optimization, fluency time periods and optimization, physical preferences, assistance preferences, or the like or a combination thereof.

Alternatively or in addition, a learners personal profile may be generated based on general information 912 about the learner, such as, but not limited to, age, weight, height, ethnicity, gender, location, education, profession, occupation, economic status, heart rates, vitals, or the like or a combination thereof. The learner's general information 912 may be provided by the learner, by a third party such as, for example, a caregiver, by an electronic device such as, for example, a wearable device, or by a database the includes such information about the user such as, for example, a social media profile.

Alternatively or in addition, a learners personal profile may be generated based on a learners medical history/diagnosis 913. The medical history/diagnosis 913 may include information about, but is not limited to, sickness, disability, limitations, abilities, triggers, allergies, or the like, or a combination thereof. The medical history/diagnosis 913 information may be provided based on user input (e.g., by the learner, a caregiver, a medical professional, a facilitator, etc.) or may be provided by any other applicable manner such as via a medical database, electronic health records, or other location that includes such information. According to an implementation, the personal profile for a learner may be supplemented, updated, or modified based on the collection of data over time such as, for example, medical data collected via a device (e.g., transceiver, mobile device, wearable device, medical device, electronic device, mechanical device, haptic device, sensor based device, visual device, audio device, interactive device, or the like, etc.) As an example, a learner's daily activity may be tracked and logged based on input provided to a device and may include the learners dietary intake, detection of bowel movements via a wearable device, and sleep monitoring. The collected data may be stored and/or analyzed and may become part of the learner's personal profile.

Alternatively or in addition, a learners personal profile may be generated based on goals and aspiration 914. The goals 914 may correspond to a learner's goals or those of a third party such as, but not limited to, a caregiver, an employer, a facilitator, or the like. The goals 914 may be provided to the system via any applicable manner such as via a mobile device application, a profile creation process, a combination thereof, or the like. For example, a learner may provide the goals 914 while setting up her profile via a mobile device application that will provide her the activity steps for designated activities. The goals 914 may be any applicable goals such as, but not limited to, activities, types of activities, times, independence, tasks, or the like, or a combination thereof.

The activity step creation process 930 may also receive input regarding a pre-assessment profile 920. The pre-assessment profile, as discussed herein, may be designated activity specific and may be generated based on a learner's inputs to one or more prompts. Alternatively or in addition, the pre-assessment profile may be generated based on data 922 gathered during a learner's attempt to perform a designated activity or activity steps. The attempts may be assisted or may be unassisted, as indicated in FIG. 9.

According to an implementation, a learner's personal profile 910 may be updated one or more times. The personal profile 910 may be updated at given time intervals or may be updated based on the occurrence of one or more events such as, for example, based on the learners interaction with the activity steps, the feedback information, a learners progress as determined automatically by the system or as input by an individual, a learners well being, a learner's community or a community of individuals for whom data is collected, a learner's daily activities, travel, employment, social interactions, goals, aspirations, or the like. For example, a learners goals may be provided at 914, as disclosed herein. The goals may be part of the learner's personal profile and at a point in time later than when the goals were provided, an assessment may be made regarding whether the goals were met. For example, a learner may self assess her performance of a designated activity and/or a third party user may assess a learner's performance of the designated activity. A comparison may be made based on the learners assessment and the third party's assessment and a determination may be made regarding whether the learner's goals have been met. Based on the determination, the learner's personal profile may be updated. A learners personal profile may be updated continuously based on new inputs and/or lack of inputs. It will be understood that a learner's personal profile may be updated based on other criteria other than assessments of the learners performance. For example, a learners personal profile may be updated based on a change in a medical diagnosis for the learner.

Additionally, a designated activity profile 940 may be provided to the activity step creation process 930 and may include the task focus 942, task prerequisite 944, age categorization 946, as well as one or more other inputs applicable to the activity step creation process 930. It will be understood that the task focus 942, task prerequisite 944, and age categorization 946 inputs are provided as examples only. The task focus 942 may include the category that a given designated activity corresponds to. For example, the task focus 942 may indicate whether the designated activity corresponds to travel, self-care, communication, behavior, employment, physical activity, exercise, or the like or a combination thereof. The task prerequisite 944 may include any criteria that should be and/or needs to be accomplished prior to a learner performing a given designated activity. The prerequisite 944 may include abilities such as motor skills, mobility, visual ability, verbal ability, physical ability, past designated tasks, mastery designation(s), fluency designation(s), levels for the same, or the like, or a combination thereof. For example, a designated activity of making a cup of tea may include a prerequisite 944 of a medium level of mobility whereas a designated activity of picking up groceries may include a prerequisite 944 of a high level of mobility. Additionally, age information 946 may be provided within a task profile and may include, for example, an age designation for a learner such as, for example, whether the learner is a child, young adult, adult, or an elderly learner.

Figure 10:
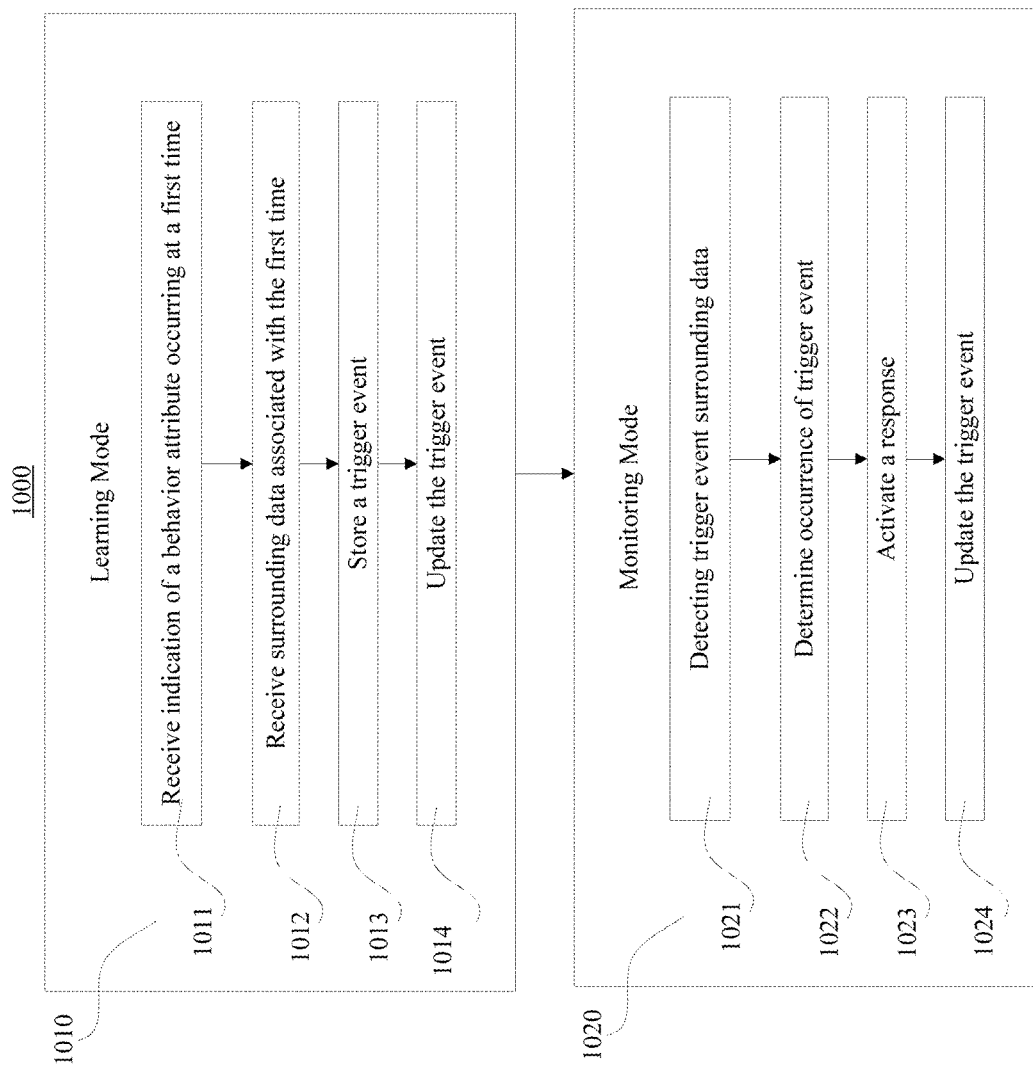
FIG. 10 is a flowchart that shows a learning mode and a monitoring mode.

According to an implementation of the disclosed subject matter, as shown in FIG. 10, a user's behavior may be learned and monitored. At step 1010, a learning mode may be entered. The learning mode may be a mode where data about a user's behavior attributes as well as surrounding data that occurs at the time of given behavior attributes. The learning mode may be for a given amount of time or may be active for an indefinite amount of time such that the system is constantly updated via the learning mode. The learning mode may be activated automatically or may be activated based on an activation of a device, an application on a device, by wearing a wearable device, or the like. As an example, a learning mode may be activated anytime a user wears a smart watch configured to enter the learning mode. The smart watch may include one or more sensors that can provide surrounding data or may be in connection with one or more sensors that allow collection of surrounding data.

At 1011, a first indication of a behavior attribute occurring at a first time may be received. An indication may be provided by a user, a non-user individual, or may be provided by a device such as, but not limited to, a transceiver, mobile device, wearable device, medical device, electronic device, mechanical device, haptic device, sensor based device, visual device, audio device, interactive device, or the like, etc. An individual other than the user may provide an indication using her own device such that, for example, a caregiver's device may include an application which associates the caregiver with the user such that the caregiver can provide indications about the user using her device. As a specific example, an indication of a behavior attribute may be provided by a caregiver who detects that a behavior attribute is occurring at a first time. Alternatively or in addition, an indication may be provided by a device such as a wearable smart watch that is configured to detect a user's vitals and detects a change in vitals above a threshold.

A behavior attribute may be any applicable factor, feeling, circumstance, or the like which a user or third party may monitor and/or seek to improve. Behavior attributes can include, but are not limited to, stress, pain, anxiety, panic, anger, negative state, positive state, or the like, or a combination thereof. As an example, an indication may be received that a user has entered an unstable mode. The unstable mode may be detected by a caregiver, may be indicated by a change in vitals, and/or may be indicated as a result of both a caregiver input and a change in vitals.

According to an implementation, additional information may be requested based on receiving an indication, at step 1011. For example, a user's caregiver may provide an indication that a user demonstrated Self Injury Behavior (SIB). Based on the indication and, optionally, one or more other factors such as those provided in the users personal profile, additional information may be requested and may include input regarding the cause of the behavior attribute, conditions surrounding the behavior, the users response during the behavior attribute, rewards attributed to the behavior attribute, or an open ended platform may be provided for information to be input. Such information may be analyzed and may contribute to the surrounding information, as further discussed herein.

At step 1012, surrounding data associated with the first time may be received. Surrounding data may be any applicable data about anything that is present or valid at the first time. Surrounding data can include data about the user (e.g. vitals, location, mood, health, clothing, or the like, or a change in any such information, or a combination thereof), about the environment (e.g., weather, traffic, social setting, location, individuals around the user, or the like, or a change in any such information, or a combination thereof) and can include health condition, a location, a weather condition, an external condition, a user action, a sensory feedback, a third party presence, a sound, a color, an image, a height, a number of people, vibration, movement, or a volume. According to an implementation, surrounding data may be gathered using a speech recognition system that detects speech, words, pitch, volume, etc. Surrounding data may be provided by a user, a non-user individual, or any device such as, but not limited to a transceiver, mobile device, wearable device, medical device, electronic device, mechanical device, haptic device, sensor based device, visual device, audio device, interactive device, or the like, etc. According to an implementation, all or part of the surrounding data may be stored in relation to baseline data such that the surrounding data is a deviation from baseline data experienced by or around the user. For example, a user's baseline resting heart rate may be determined and the surrounding data associated with the first time may be stored as a deviation from the baseline resting heart rate (i.e., instead of a specific heart rate number).

At 1013, a trigger event may be stored for the behavior attribute, and may include trigger event surrounding data, which includes all or part of the surrounding data of step 1012. A trigger event may be a combination of all or part of the surrounding data and may be associated with the behavior attribute. As a non-limiting example, a trigger event may be an anxiety attack associated with a change in temperature from a high temperature to a low temperature. According to this example, the anxiety attack is the behavior attribute and the surrounding data is the change in temperature. A trigger event may be stored locally, such as on a users mobile device, may be stored in a remote location such as a server, or may be distributed.

At 1014, a trigger event may be updated for a behavior attribute based on iterations of the steps 1011 through 1013 such that the trigger event that is stored is updated based on receiving another indication of the same behavior attribute (e.g., an anxiety attack) occurring at a time after the trigger event was stored and surrounding data being received at that second time. Accordingly, the trigger event for behavior attributes and their corresponding trigger event surrounding data may be updated one or more times based on one or more indications of the behavior attribute occurring. According to an implementation, the trigger event may be stored based on pattern recognition of two or more of the indications of the behavior attributes and their respective surrounding data. A machine learning algorithm may be used to detect patterns in multiple indications.

Step 1020 of FIG. 10 shows a monitoring mode which includes step 1021 of detecting the trigger event surrounding data. The trigger event surrounding data may be detected via any applicable means and may be collected via the same input that collected the surrounding data in step 1012 or via different inputs. The surrounding data may be detected by a user, a non-user individual, or any device such as, but not limited to a transceiver, mobile device, wearable device, medical device, electronic device, mechanical device, haptic device, sensor based device, visual device, audio device, interactive device, or the like, etc.

At step 1022, a determination may be made that the trigger event has occurred based on detecting the trigger event surrounding data. The determination may be made based on a comparison of the trigger event surrounding data that is stored in a local or remote location to surrounding data that occurs at a given point in time. A processor such as a processor in a device such as a mobile device or wearable device may monitor for trigger event surrounding data and may determine that the surrounding data at a given time matches a trigger event surrounding data.

At 1023, a response may be activated based on detecting the occurrence of the trigger event. The response may be any applicable response including, not limited to, alerting a user, alerting a non-user, sending a signal, modifying a surrounding data attribute, providing support to the user, providing instructions to the user, or the like, or a combination thereof. The response may be pre-determined or may be determined based on specifics attributes of the detected trigger event surrounding data. The response may be based at least in part based on the degree of surrounding data. For example, a trigger event may be detected based on the change in temperature. The response based on the trigger event may be to alert the user if the temperature change is below a threshold (e.g., 5 degrees). Alternatively, the response based on the trigger event may be to notify a caregiver if the temperature change is above the threshold (e.g., 10 degrees). According to an implementation, the response may include providing audio or visual scripts, directions, guidance, or the like, to a user. The response may be provided using a virtual/augmented reality delivery system that may enable the user to either remove herself from an environment or to augment the environment to provide the user with a helpful response. The response may be provided using a hologram delivery system that may show the user an object, a person, an event, an activity, or the like or a combination thereof (e.g., a user may see a relative who speaks to the user via the hologram delivery system). According to an implementation, a response may be to connect a user to a non-user via audio, video, virtual/augmented reality, and/or a hologram system such that the user is able to communicate with the non-user. For example, the response may be to connect the user with a medical professional who is able to guide the user.

According to an implementation, feedback regarding a response may be received. The feedback may be provided by the user or a non-user such as another individual, device, or automated feedback provider. The feedback may include an evaluation of the response, suggestions regarding improvement of the response, response augmenting attributes, alternative suggestions, or the like.

At step 1024, the trigger event for a given behavior attribute may be updated based on the occurrence of the trigger event such that the surrounding data collected during the occurrence of the trigger event may result in an updated trigger event. Accordingly, the trigger event for behavior attributes and their corresponding trigger event surrounding data may be updated one or more times based on actual occurrences of the trigger event. For example, a trigger event may be stored for a panic attack which may include a first set of surrounding data. Upon the occurrence of a panic attack, recorded by a wearable device and based on input from sensors, the first surrounding data may be compared with surrounding data during the panic attack. The surrounding data during the panic attack may include the presence of a given individual while the attack occurred. The trigger event surrounding data may be updated to reflect the presence of this given individual and associate the presence with the trigger event buy including the presence in updated trigger event surrounding data. It will be understood that the example may be a simplification such that the presence of a given individual may become part of the trigger event surrounding data only after a threshold number of recorded events, or may be based on a comparison of a group of people which include the given individual, or the like.

According to an implementation of the disclosed subject matter, one or more personalized responses may be provided to a learner based on an inquiry and the learners personal profile. The personalized response to the inquiry may be based on qualities, limitations, and/or preferences of a user such that the personalized response may enable the user to function, perform, or otherwise use the personalized response in a manner that is more beneficial than if the user received a response that was not the personalized response. In some scenarios, a non-personalized response may be harmful to a user (e.g., where the response may lead to a trigger event, as disclosed herein).

An inquiry may be any input, trigger, request, or the like, or a combination thereof, and may be provided by a user, by a non-user, by a system, or based on pre-determined criteria such as a trigger based on an event or based on a time based trigger. The inquiry may be provided via any device such as, but not limited to, a mobile device, wearable device, medical device, electronic device, mechanical device, haptic device, sensor based device, visual device, audio device, interactive device, or the like, etc.

The inquiry may be received and analyzed in view of the learner's personal profile. According to an implementation, an understanding of the inquiry itself may be made based on a user's personal profile such that the same inquiry for a first user may be a different inquiry than the same inquiry for a second user. As an example, a first user and a second user may input an inquiry by requesting the weather. The system may, based on personal profile data, determine that the inquiry for the first user is a request for the weather for the day and applicable clothing options for the individual to wear specifically given a mobility disability whereas the inquiry for the second user is a request for the weather for the week.

A personal response to the inquiry and an applicable format may be generated based on the personal profile information of a given user. The applicable format may be a media type and/or an output device such that the media type and/or output device are best suited for the user and use a minimum amount of resources within the system. Continuing the previous example, a video or hologram may be provide to a user based on the user's receptiveness to either of the media types and the video or hologram may be provided via a device near the users closet such that the user can implement the clothing suggested by the response by selecting it from the closet.

It will be understood that any techniques disclosed herein may be implemented using a computer or other computing device and may be implemented using one or more processors, wireless nodes, servers, databases, or other applicable devices.

The figures provided herein are provided as an example only. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A system for treating a cognitive disability, the system comprising:
   a memory;
   a processor, the processor configured to:
   receive a designated activity;
   generate a pre-assessment profile for a learner based on a cognitive disability of the learner and based on the designated activity;
   generate a plurality of activity steps for the learner to perform the designated activity;
   identify a media type for each activity step of the plurality of activity steps based on the pre-assessment profile;
   select one or more output devices to output the plurality of activity steps, the one or more output devices each selected for each activity step based on the pre-assessment profile, based on the media type and based on available resources to output each activity step of the plurality of activity steps;
   digitally provide the plurality of activity steps to the learner based on the media type for each activity step, via the selected one or more output devices for each activity step, wherein only the media type for each of the activity steps is provided to reduce resource allocation;
   receive feedback information based on a performance of the plurality of activity steps by the learner;
   assess an ability of the learner to perform the designated activity, based on the feedback information; and
   assign at least one of a mastery designation or a fluency designation based on the assessment.

2. The system of claim 1, wherein the processor is configured to generate the pre-assessment profile based on evaluating learner provided responses to one or more prompts.

3. The system of claim 2, wherein the media type varies for each activity step.

4. The system of claim 1, wherein the feedback information is generated based on an assessment and wherein a time to conduct the assessment is determined based on at least one of the pre-assessment profile or a personal profile.

5. The system of claim 1, wherein the plurality of activity steps comprise a sequential order and providing the plurality of activity steps comprises providing the plurality of activity steps in the sequential order.

6. The system of claim 1, wherein the media type has a media type graded value based on an amount of information.

7. The system of claim 6, wherein the processor is further configured to implement treatment of a cognitive disability based on modifying one of the plurality of activity steps provided to the learner by at least one of changing the media type, deactivating an activity step, and removing the activity step.

8. The system of claim 6, wherein changing the media type of a particular activity step comprises:
   changing the media type of the particular activity step to an updated media type with a graded value that indicates a greater amount of information, if the feedback information indicates that the learner has not learned the particular activity step; and changing the media type of the particular activity step to an updated media type with a graded value that indicates a lower amount of information, if the feedback information indicates that the learner has learned the particular activity step.

9. The system of claim 8, wherein the processor is further configured to implement treatment of a cognitive disability based on assessing the ability to perform the designated activity comprises generating an analyzed graded value.

10. The system of claim 1, wherein the processor is further configured to implement treatment of a cognitive disability based on identifying an activity step of the plurality of activity steps as a mastered step, based on the feedback information.

11. The system of claim 10, wherein assessing the ability to perform the designated activity comprises at least one of calculating a change in a ratio of mastered steps to a number of the plurality of activity steps or generating an analyzed graded value.

12. The system of claim 10, wherein the processor is further configured to implement treatment of a cognitive disability based on one of removing an activity step that is identified as a mastered activity step from the plurality of activity steps provided to the learner or re-inserting the removed activity step after removing the mastered activity step.

13. The system of claim 1, wherein the feedback information is provided by at least one of a transceiver, a mobile device, a wearable device, a video camera, an audio recording device, or a photo camera.

14. The system of claim 1, wherein the media type comprises one or more of video, image, audio, vibration, touch, hologram, virtual reality, augmented reality, or text.

15. The system of claim 1, wherein the processor is further configured to implement treatment of a cognitive disability based on determining one or more optimal media type components, based on the feedback information, wherein the one or more optimal media type components enable the learner to learn faster than other media type components.

16. The system of claim 1, wherein the processor is further configured to implement treatment of a cognitive disability based on receiving personal profile information from a personal profile wherein the personal profile information is used for one or more of receiving the designated activity, generating the pre-assessment profile, generating the plurality of activity steps, or identifying the media type and wherein the personal profile information is updated based on the feedback information.

17. The system of claim 1, wherein digitally providing the plurality of activity steps to a learner further comprises providing video, audio, image, augmented reality, and/or virtual reality data to a user.

18. The system of claim 1, wherein the feedback information based on the performance of the plurality of activity steps is further based on analyzing the performance via at least one of a machine learning analysis and a video analysis.

\* \* \* \* \*